United States Patent
Lim et al.

(10) Patent No.: US 10,222,835 B2
(45) Date of Patent: Mar. 5, 2019

(54) MOBILE TERMINAL

(71) Applicant: LG ELECTRONICS INC., Seoul (KR)

(72) Inventors: Seunggeun Lim, Seoul (KR); Taehyun Kim, Seoul (KR); Zhimin Choo, Seoul (KR); Hyunjin Yoon, Seoul (KR); Sanghyuck Lee, Seoul (KR); Seihyun Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/547,610

(22) PCT Filed: Oct. 28, 2015

(86) PCT No.: PCT/KR2015/011435
§ 371 (c)(1),
(2) Date: Jul. 31, 2017

(87) PCT Pub. No.: WO2016/125985
PCT Pub. Date: Aug. 11, 2016

(65) Prior Publication Data
US 2018/0164852 A1    Jun. 14, 2018

(30) Foreign Application Priority Data

Feb. 6, 2015  (KR) .................. 10-2015-0018836
Feb. 6, 2015  (KR) .................. 10-2015-0018837

(51) Int. Cl.
*G06F 1/16*    (2006.01)
*H04M 1/02*    (2006.01)

(52) U.S. Cl.
CPC ........ *G06F 1/1652* (2013.01); *H04M 1/0214* (2013.01); *H04M 1/0237* (2013.01); *H04M 1/0268* (2013.01)

(58) Field of Classification Search
None
See application file for complete search history.

(56) References Cited

U.S. PATENT DOCUMENTS

| | | | |
|---|---|---|---|
| D589,923 S | 4/2009 | Kim et al. | |
| 8,971,031 B2* | 3/2015 | Mok | G06F 1/1652 349/58 |
| 9,164,547 B1* | 10/2015 | Kwon | G06F 1/1656 |
| 9,173,287 B1* | 10/2015 | Kim | H05K 1/028 |

(Continued)

FOREIGN PATENT DOCUMENTS

| | | |
|---|---|---|
| EP | 2765479 A2 | 8/2014 |
| KR | 10-2011-0100936 A | 9/2011 |

(Continued)

*Primary Examiner* — Xanthia C Cunningham
(74) *Attorney, Agent, or Firm* — Birch, Stewart, Kolasch & Birch, LLP

(57) ABSTRACT

Disclosed is a mobile terminal comprising a flexible display unit, which includes a deformation area that may be deformed to a folded state and an unfolded state by an external force; a body portion supporting one area of the flexible display unit on a front surface; a deformation support unit supporting the display unit, having a first living hinge unit corresponding to the deformation area; and a folding unit built in the body portion, guiding deformation of the display unit by means of the external force.

22 Claims, 33 Drawing Sheets

(56) References Cited

U.S. PATENT DOCUMENTS

| | | | |
|---|---|---|---|
| 9,274,560 B2* | 3/2016 | Ahn | G06F 1/1679 |
| 9,317,067 B2* | 4/2016 | Choi | G06F 1/1677 |
| 9,348,362 B2* | 5/2016 | Ko | G06F 1/1626 |
| 9,348,370 B2* | 5/2016 | Song | G06F 1/1681 |
| 9,582,043 B2* | 2/2017 | Hirakata | |
| 9,625,955 B2* | 4/2017 | Liao | G06F 1/1681 |
| 9,710,021 B2* | 7/2017 | Kauhaniemi | G06F 1/1652 |
| 9,791,891 B2* | 10/2017 | Jung | G06F 1/1652 |
| 9,811,119 B2* | 11/2017 | Seo | G06F 1/1652 |
| 2008/0167098 A1 | 7/2008 | Mizuta et al. | |
| 2010/0229491 A1 | 9/2010 | Pervan | |
| 2011/0241998 A1* | 10/2011 | McKinney | G06F 1/1616 345/168 |
| 2012/0002360 A1* | 1/2012 | Seo | G06F 1/1616 361/679.01 |
| 2012/0262870 A1* | 10/2012 | Leung | G06F 1/1626 361/679.27 |
| 2012/0264489 A1* | 10/2012 | Choi | H04M 1/0216 455/566 |
| 2012/0307423 A1* | 12/2012 | Bohn | G06F 1/1641 361/679.01 |
| 2013/0021762 A1* | 1/2013 | van Dijk | G06F 1/1652 361/749 |
| 2013/0037228 A1* | 2/2013 | Verschoor | G06F 1/1652 160/377 |
| 2014/0123436 A1* | 5/2014 | Griffin | H04M 1/0216 16/221 |
| 2015/0055287 A1* | 2/2015 | Seo | G06F 1/1652 361/679.27 |
| 2015/0169006 A1* | 6/2015 | Chong | G09G 3/20 345/173 |
| 2016/0034047 A1* | 2/2016 | Lee | G09G 5/373 345/156 |
| 2016/0085319 A1* | 3/2016 | Kim | G06F 3/0346 345/156 |
| 2016/0139634 A1* | 5/2016 | Cho | G06F 1/1652 361/679.27 |

FOREIGN PATENT DOCUMENTS

| | | |
|---|---|---|
| KR | 10-2013-0073331 A | 7/2013 |
| KR | 10-2014-0049911 A | 4/2014 |

* cited by examiner

MOBILE TERMINAL

CROSS-REFERENCE TO RELATED APPLICATION

This application is the National Stage filing under 35 U.S.C. § 371 of International Application No. PCT/KR2015/011435, filed on Oct. 28, 2015, which claims the benefit of earlier filing date and right of priority to Korean Application Nos. 10-2015-0018836, filed on Feb. 6, 2015, and 10-2015-0018837, filed on Feb. 6, 2015, the contents of which are all hereby incorporated by reference herein in their entirety.

TECHNICAL FIELD

The present invention relates to a mobile terminal that enables at least a part of a display unit to be bent or folded.

BACKGROUND ART

A mobile terminal includes all types of devices provided with a battery and a display unit and carried by a user. The devices are configured to output information to the flexible display unit using power supplied from the battery. The mobile terminal includes a device for recording and playing moving images, a device for displaying a graphic user interface (GUI), etc., which includes a notebook, a mobile phone, glasses, a watch, a game console, etc.

Such a mobile terminal has become increasingly more functional. Examples of such functions include data and voice communications, capturing images and video via a camera, recording audio, playing music files via a speaker system, and displaying images and video on a display. Some mobile terminals include additional functionality which supports game playing, while other mobile terminals are configured as multimedia players. More recently, mobile terminal s have been configured to receive broadcast and multicast signals which permit viewing of content such as videos and television programs.

Such a mobile terminal is being evolved to have various designs. In order to satisfy a user's needs for more novel and various designs, efforts are ongoing to develop the mobile terminal of a newer type. The newer type includes structural changes and improvements to use the mobile terminal more conveniently. One of such structural changes and improvements is a mobile terminal including at least part of a display unit that can be bent or folded. In such mobile terminal, a user-friendly interface using such bending characteristic is needed.

For a mobile terminal which is bent or folded, a complicated structure for providing a dynamic power or transferring an external force is required. In this case, problems occur in that appearance of the mobile terminal is complicated or a thickness of the mobile terminal becomes thick.

DISCLOSURE OF THE INVENTION

Therefore, an object of the present invention is to provide a mobile terminal provided with a foldable display unit which is deformable in a simplified structure.

To achieve these and other advantages and in accordance with the purpose of the present invention, as embodied and broadly described herein, there is provided a mobile terminal comprising a flexible display unit, which includes a deformation area that may be deformed to a folded state and an unfolded state by an external force; a body portion supporting one area of the flexible display unit on a front surface; a deformation support unit supporting the display unit, having a first living hinge unit corresponding to the deformation area; and a folding unit built in the body portion, guiding deformation of the display unit by means of the external force.

As an example related to the present invention, the body portion includes first and second bodies detached from each other, and the folding unit is formed between the first and second bodies, and includes a second living hinge unit arranged to correspond to the first living hinge unit.

As an example related to the present invention, the folding unit includes a first connecting unit formed at one end of the second living hinge unit and fixed to the second body and a second connecting unit formed at the other end of the second living hinge unit, having a guide groove formed slidably in the first body along a first direction which is a length direction of the body portion, and the second body includes a guide protrusion inserted into the guide groove.

As an example related to the present invention, one area of the second living hinge unit is exposed by the first and second bodies in the unfolded state, and if the unfolded state is switched to the folded state, the other area of the second living hinge unit is exposed to the first and second bodies by sliding of the second connecting unit.

As an example related to the present invention, the second living hinge unit includes a plurality of ribs formed to be spaced apart from one another by the external force.

As an example related to the present invention, the plurality of ribs are arranged to be closely attached to one another in the folded state, and each rib is provided with a fitting protrusion protruded from one side and a fitting groove recessed from the other side such that a fitting protrusion of another adjacent rib is fitted thereinto.

As an example related to the present invention, the fitting protrusion may be arranged between the respective ribs in the folded state.

As an example related to the present invention, an external surface of the ribs is formed to constitute one surface with external surfaces of the first and second bodies in the unfolded state.

As an example related to the present invention, the folding unit further includes an elastic support member arranged below the living hinge unit and made to be elastically deformed by the external force.

As an example related to the present invention, the first and second bodies include first and second magnet units, respectively, at corresponding areas in the folded state, the first and second magnet units having polarities opposite to each other.

As an example related to the present invention, the folded state represents that the display unit is superimposed on the front surface of the body portion.

As an example related to the present invention, the folding unit includes a first frame slidably connected to the first body, a second frame fixed to the second body, and an elastic member connecting the first and second frames with each other, having a plurality of coil springs corresponding to the deformation area.

As an example related to the present invention, the first body includes a moving hole formed to move the first frame, and each of the first body and the first frame includes first and second magnet units having the same polarity as each other.

As an example related to the present invention, the display unit includes a first area supported in the body portion based on the deformation area, and a second area detached from the body portion in the unfolded state.

As an example related to the present invention, the body portion includes a main body portion supporting the first area, and a sliding body portion provided to slidably move from the main body portion.

As an example related to the present invention, the folding unit includes a link unit having one end connected to the sliding body portion and the other end connected to the display unit and interacting with the sliding body portion, and the other end of the link unit is fixed between the deformation area and the second area.

As an example related to the present invention, the link unit is received in the sliding body portion in the folded state and partially exposed in the unfolded state, and has a predetermined angle with the main body portion in the unfolded state.

As an example related to the present invention, the display unit includes first and second areas identified from each other by the deformation area, and the body portion includes a first body supporting the first area of the display unit, a second body supporting the second area in the folded state, and a third body connected to the second body, received in the first body in the folded state and exposed in the unfolded to support the second area.

As an example related to the present invention, in the folded state, the second area is arranged on a rear surface of the body portion and a spacing groove is formed between the rear surface and an end of the second area.

As an example related to the present invention, the deformation support unit includes protrusion shapes formed to adjoin a side of the display unit, arranged along a corner of the first living hinge unit and formed to be deformed by the external force.

As an example related to the present invention, the folding unit includes a button unit built to be pressed in the body portion, a first bending portion coupled to one end of the display unit and formed to be caught in the button unit, and a slide cover unit formed slidably if the button unit is pressed.

As an example related to the present invention, the folding unit further includes a first elastic member supporting the button unit, and one area of the button unit is exposed to the outside of the body portion, and the button unit includes a hanging portion formed to be fixed to the bending portion.

As an example related to the present invention, the folding unit further includes a second elastic member formed to elastically support the slide cover unit to slidably move the slide cover unit.

As an example related to the present invention, the folding unit further includes slide poles extended to a sliding direction of the slide cover unit, and a guide unit that includes a first guide rail supporting the slide cover unit to slidably move the slide cover unit and receiving the slide poles therein and a second guide rail receiving the first bending portion therein.

As an example related to the present invention, the folding unit further includes a locking portion built in one end of the second area of the display unit and detachably fixed to the slide cover unit.

As an example related to the present invention, the slide cover unit further includes a second bending portion bent in an opposite direction of the first bending portion and formed to be caught in the locking portion, and the locking portion includes a locking groove recessed to allow the second bending portion to be caught therein.

As an example related to the present invention, the slide cover unit is coupled to the locking unit by being slid to be spaced apart from the support unit if the slide cover unit is detached from the button unit.

As an example related to the present invention, the slide cover unit further includes a fitting protrusion formed on one surface, and the locking portion further includes a fitting groove to allow the fitting protrusion to be fitted thereinto if the slide cover unit is detached from the button unit.

As an example related to the present invention, the display unit includes a link unit formed on an inner surface of the second area and formed to be deformed by an external force, the link unit being comprised of a plurality of link members flexibly connected to one another to correspond to a curvature radius of the display unit.

As an example related to the present invention, an end of the second area is coupled to the slide cover unit, and the body portion further includes a stopper for restricting movement of the slide cover unit.

According to the present invention, the folded state of the display unit may be achieved by the folding unit formed to deform one area of the display unit while forming a curved surface.

Damage of the display unit, which is generated during deformation, may be minimized by the living hinge unit supporting the deformation area of the display unit, and switching of the folded state and the unfolded state of the display unit may be performed more stably by the magnet units included in the deformation unit, the slide structure and the elastic members.

Also, the display unit may be received more stably in the body portion of the mobile terminal in the folded state by the bending portion formed to be caught in the locking portion and the button unit, and a user may switch the display unit to the unfolded state more easily by applying the external force to the button unit which is elastically supported.

Also, as the end of the display unit is supported by the slide cover unit, the unfolded state may be achieved more stably.

Also, damage of the display unit may be minimized by the link unit while the display unit is being deformed, and the external force may be applied to the button unit, whereby the state of the display unit may be varied more easily.

BRIEF DESCRIPTION OF THE DRAWINGS

FIG. 8A is a conceptual view illustrating a structure of a third folding unit in an unfolded state;

FIG. 8B is a conceptual view illustrating a state of a deformation unit in an unfolded state and a folded state;

MODES FOR CARRYING OUT THE PREFERRED EMBODIMENTS

Figure 1:
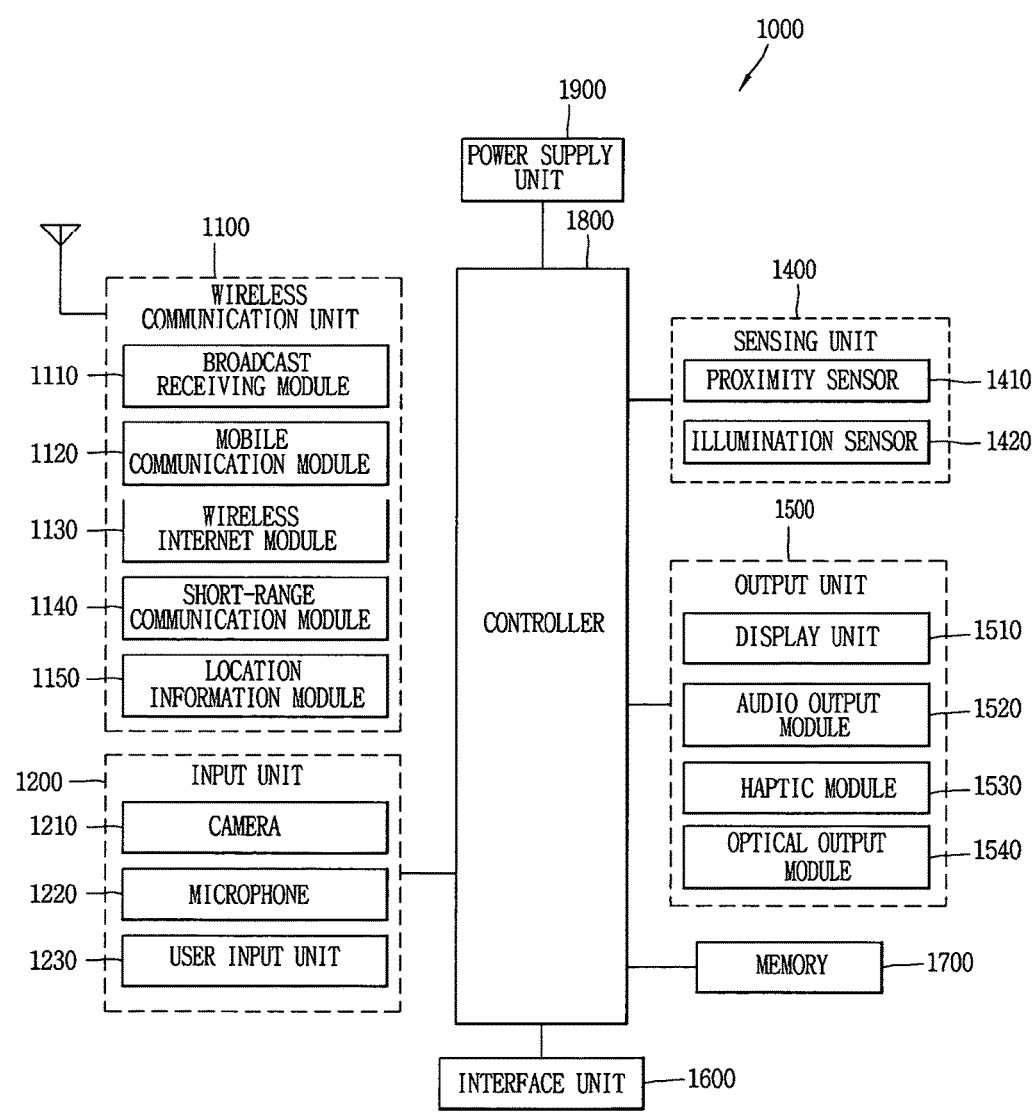
FIG. 1 is a block diagram illustrating a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with the present disclosure.

The mobile terminal 1000 is shown having components such as a wireless communication unit 1100, an input unit 1200, an electromagnetic wave generator 1300, a sensing unit 1400, an output unit 1500, an interface unit 1600, a memory 1700, a controller 1800, and a power supply unit 1900. It is understood that implementing all of the illustrated components is not a requirement, and that greater or fewer components may alternatively be implemented.

Referring now to FIG. 1, the mobile terminal 1000 is shown having wireless communication unit 1100 configured with several commonly implemented components. For instance, the wireless communication unit 1100 typically includes one or more components which permit wireless communication between the mobile terminal 1000 and a wireless communication system or network within which the mobile terminal is located.

The wireless communication unit 1100 typically includes one or more modules which permit communications such as wireless communications between the mobile terminal 1000 and a wireless communication system, communications between the mobile terminal 1000 and another mobile terminal, communications between the mobile terminal 1000 and an external server. Further, the wireless communication unit 1100 typically includes one or more modules which connect the mobile terminal 1000 to one or more networks. To facilitate such communications, the wireless communication unit 1100 includes one or more of a broadcast receiving module 1110, a mobile communication module 1120, a wireless Internet module 1130, a short-range communication module 1140, and a location information module 1150.

The input unit 1200 includes a camera 1210 for obtaining images or video, a microphone 1220, which is one type of audio input device for inputting an audio signal, and a user input unit 1230 (for example, a touch key, a push key, a mechanical key, a soft key, and the like) for allowing a user to input information. Data (for example, audio, video, image, and the like) is obtained by the input unit 1200 and may be analyzed and processed by controller 1800 according to device parameters, user commands, and combinations thereof.

The electromagnetic wave generator 1300 is a trigger signal for controlling an external device positioned at a short distance, and generates electromagnetic waves having linearity. More specifically, the electromagnetic wave generator 1300 generates electromagnetic waves having a specific frequency under control of the controller 1800. That is, electromagnetic waves generated by the electromagnetic wave generator 1300 may have various frequencies under control of the controller 1800. The electromagnetic waves may include various data for controlling an external device. More specifically, the electromagnetic waves may include a request message for requesting information on an external device, and an identifier for security.

The sensing unit 1400 is typically implemented using one or more sensors configured to sense internal information of the mobile terminal, the surrounding environment of the mobile terminal, user information, and the like. For example, the sensing unit 1400 is shown having a proximity sensor 1410 and an illumination sensor 1420.

If desired, the sensing unit 1400 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 1210), a microphone 1220, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 1000 may be configured to utilize information obtained from sensing unit 1400, and in particular, information obtained from one or more sensors of the sensing unit 1400, and combinations thereof.

The output unit 1500 is typically configured to output various types of information, such as audio, video, tactile output, and the like. The output unit 1500 is shown having a display unit 1510, an audio output module 1520, a haptic module 1530, and an optical output module 1540.

The display unit 1510 may have an inter-layered structure or an integrated structure with a touch sensor in order to facilitate a touch screen. The touch screen may provide an output interface between the mobile terminal 1000 and a user, as well as function as the user input unit 1230 which provides an input interface between the mobile terminal 1000 and the user.

The display unit 1510 is generally configured to output information processed in the mobile terminal 1000. For example, the display unit 1510 may display execution screen information of an application program executing at the mobile terminal 1000 or user interface (UI) and graphic user interface (GUI) information in response to the execution screen information.

The display unit 1510 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 1510 may be implemented using two display devices, which can implement the same or different display technology. For instance, a plurality of the display units 1510 may be arranged on one side, either spaced apart from each other, or these devices may be integrated, or these devices may be arranged on different surfaces.

The display unit 1510 may also include a touch sensor which senses a touch input received at the display unit. When a touch is input to the display unit 1510, the touch sensor may be configured to sense this touch and the controller 1800, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 1510' and a display on a rear surface of the window 1510', or a metal wire which is patterned directly on the rear surface of the window 1510'. Alternatively, the touch sensor may be integrally formed with the display. For example, the touch sensor may be disposed on a substrate of the display or within the display.

The display unit 1510 may also form a touch screen together with the touch sensor. Here, the touch screen may serve as the user input unit 1230 (see FIG. 1). Therefore, the touch screen may replace at least some of the functions of the first manipulation unit 1230.

The interface unit 1600 serves as an interface with various types of external devices that can be coupled to the mobile terminal 1000. The interface unit 1600, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 1600.

The memory 1700 is typically implemented to store data to support various functions or features of the mobile terminal 1000. For instance, the memory 1700 may be configured to store application programs executed in the mobile terminal 1000, data or instructions for operations of the mobile terminal 1000, and the like. Some of these application programs may be downloaded from an external server via wireless communication. Other application programs may be installed within the mobile terminal 1000 at time of manufacturing or shipping, which is typically the case for basic functions of the mobile terminal 1000 (for example, receiving a call, placing a call, receiving a message, sending a message, and the like). It is common for application programs to be stored in the memory 1700, installed in the mobile terminal 1000, and executed by the controller 1800 to perform an operation (or function) for the mobile terminal 1000.

The controller 1800 typically functions to control overall operation of the mobile terminal 1000, in addition to the operations associated with the application programs. The controller 1800 may provide or process information or functions appropriate for a user by processing signals, data, information and the like, which are input or output by the various components depicted in FIG. 1, or activating application programs stored in the memory 1700. As one example, the controller 1800 controls some or all of the components illustrated in FIG. 1 according to the execution of an application program that have been stored in the memory 1700.

The power supply unit 1900 can be configured to receive external power or provide internal power in order to supply appropriate power required for operating elements and components included in the mobile terminal 1000. The power supply unit 1900 may include a battery, and the battery may be configured to be embedded in the terminal body, or configured to be detachable from the terminal body.

Referring still to FIG. 1, various components depicted in this figure will now be described in more detail. Regarding the wireless communication unit 1100, the broadcast receiving module 1110 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 1110 may be utilized to facilitate simultaneously receiving of two or more broadcast channels, or to support switching among broadcast channels.

The mobile communication module 1120 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 1120 include audio call signals, video (telephony) call signals, or various formats of data to support communication of text and multimedia messages.

The wireless Internet module 1130 is configured to facilitate wireless Internet access. This module may be internally or externally coupled to the mobile terminal 1000. The wireless Internet module 1130 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 1130 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 1130 performs such wireless Internet access. As such, the Internet module 1130 may cooperate with, or function as, the mobile communication module 1120.

The short-range communication module 1140 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 1140 in general supports wireless communications between the mobile terminal 1000 and a wireless communication system, communications between the mobile terminal 1000 and another mobile terminal 1000, or communications between the mobile terminal and a network where another mobile terminal 1000 (or an external server) is located, via wireless area networks. One example of the wireless area networks is a wireless personal area networks.

In some embodiments, another mobile terminal (which may be configured similarly to mobile terminal 1000) may be a wearable device, for example, a smart watch, a smart glass or a head mounted display (HMD), which is able to exchange data with the mobile terminal 1000 (or otherwise cooperate with the mobile terminal 1000). The short-range communication module 1140 may sense or recognize the wearable device, and permit communication between the wearable device and the mobile terminal 1000. In addition, when the sensed wearable device is a device which is authenticated to communicate with the mobile terminal 1000, the controller 1800, for example, may cause transmission of data processed in the mobile terminal 1000 to the wearable device via the short-range communication module 1140. Hence, a user of the wearable device may use the data processed in the mobile terminal 1000 on the wearable device. For example, when a call is received in the mobile terminal 1000, the user may answer the call using the wearable device. Also, when a message is received in the mobile terminal 1000, the user can check the received message using the wearable device.

The location information module 1150 is generally configured to detect, calculate, derive or otherwise identify a position of the mobile terminal. As an example, the location information module 1150 includes a Global Position System (GPS) module, a Wi-Fi module, or both. If desired, the location information module 1150 may alternatively or additionally function with any of the other modules of the wireless communication unit 1100 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 1200 may be configured to permit various types of input to the mobile terminal 1200. Examples of such input include audio, image, video, data, and user input. Image and video input is often obtained using one or more cameras 1210. Such cameras 1210 may process image frames of still pictures or video obtained by image sensors in a video or image capture mode. The processed image frames can be displayed on the display unit 1510 or stored in memory 1700. In some cases, the cameras 1210 may be arranged in a matrix configuration to permit a plurality of images having various angles or focal points to be input to the mobile terminal 1000. As another example, the cameras 1210 may be located in a stereoscopic arrangement to acquire left and right images for implementing a stereoscopic image.

The microphone 1220 is generally implemented to permit audio input to the mobile terminal 1000. The audio input can be processed in various manners according to a function being executed in the mobile terminal 1000. If desired, the microphone 1220 may include assorted noise removing algorithms to remove unwanted noise generated in the course of receiving the external audio.

The user input unit 1230 is a component that permits input by a user. Such user input may enable the controller 1800 to control operation of the mobile terminal 1000. The user input unit 1230 may include one or more of a mechanical input element (for example, a key, a button located on a front and/or rear surface or a side surface of the mobile terminal 1000, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 1400 is generally configured to sense one or more of internal information of the mobile terminal, surrounding environment information of the mobile terminal, user information, or the like. The controller 1800 generally cooperates with the sensing unit 1400 to control operation of the mobile terminal 1000 or execute data processing, a function or an operation associated with an application program installed in the mobile terminal based on the sensing provided by the sensing unit 1400. The sensing unit 1400 may be implemented using any of a variety of sensors, some of which will now be described in more detail.

The proximity sensor 1410 may include a sensor to sense presence or absence of an object approaching a surface, or an object located near a surface, by using an electromagnetic field, infrared rays, or the like without a mechanical contact. The proximity sensor 1410 may be arranged at an inner region of the mobile terminal covered by the touch screen, or near the touch screen.

The proximity sensor 1410, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 1410 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 1410 may sense proximity touch, and proximity touch patterns (for example, distance, direction, speed, time, position, moving status, and the like).

In general, controller 1800 processes data corresponding to proximity touches and proximity touch patterns sensed by the proximity sensor 1410, and cause output of visual information on the touch screen. In addition, the controller 1800 can control the mobile terminal 1000 to execute different operations or process different data according to whether a touch with respect to a point on the touch screen is either a proximity touch or a contact touch.

A touch sensor can sense a touch applied to the touch screen, such as display unit 1510, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 1510, or convert capacitance occurring at a specific part of the display unit 1510, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 1800. Accordingly, the controller 180 may sense which region of the display unit 1510 has been touched. Here, the touch controller may be a component separate from the controller 1800, the controller 1800, and combinations thereof.

In some embodiments, the controller 1800 may execute the same or different controls according to a type of touch object that touches the touch screen or a touch key provided in addition to the touch screen. Whether to execute the same or different control according to the object which provides a touch input may be decided based on a current operating state of the mobile terminal 1000 or a currently executed application program, for example.

The touch sensor may be configured to sense a touch input using a different method, in an activated or deactivated state of the display unit 1510. The different method may be related to an activation period of the touch sensor. More specifically, the touch sensor may be activated at a different period according to whether the display unit 1510 has been activated or not. That is, the touch sensor may have a different activation period according to whether the display unit 1510 has been activated or not, and may sense a touch input applied thereto.

For instance, in a deactivated state of the display unit 1510, the touch sensor may be activated with a preset period. In this instance, the preset period may be a time period more than 0. Further, in an activated state of the display unit 1510, the touch sensor may be always operated in an activated state. In this instance, an activation period of the touch sensor may be '0' or a value very close to '0'.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. Further, if a power consumption amount of the touch sensor exceeds the preset value based on '0', it may be determined that the touch sensor is in an activated state.

If the display unit 1510 is in an activated state (hereinafter, will be referred to as an active mode), the touch sensor may wait for input of taps onto the display unit 1510, while maintaining an activated state. Further, if the display unit 1510 is in a deactivated state (hereinafter, will be referred to as a doze mode), the touch sensor may be activated at preset periods.

When the preset period of the touch sensor is shorter, a sensing speed with respect to taps applied onto the display unit 1510 is higher. However, in this instance, a power consumption amount of the touch sensor may be increased. Further, when the preset period of the touch sensor is longer, a sensing speed with respect to taps applied onto the display unit 1510 may be lower, while a power consumption amount of the touch sensor is decreased.

Thus, the preset period may be set so that a sensing speed with respect to taps applied onto the display unit 1510 is high enough not to be recognized by a user, and so that power consumption can be reduced. For instance, the preset period may be set so that the touch sensor in a deactivated state can be activated about 20 times (1 Hz) per second.

While the display unit 1510 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 1510, by several times. That is, the touch sensor may be activated with a different period, according to whether the display unit 1510 is in an activated state or a deactivated state.

In a doze mode where the display unit 1510 is in a deactivated state and the touch sensor is periodically activated, if a preset touch input (e.g., a first touch input and a second touch input consecutively knocking-on a predetermined region within a predetermined time) is sensed by the touch sensor, the controller 1800 can convert the doze mode into an activate mode where the flexible display unit and the touch sensor are activated.

The touch sensor may be driven at a different period based on a state of the display unit 1510. For instance, when the display unit 1510 is in a closed state, a doze mode may be executed. Further, when a closed state is converted into an open state, an active mode may be executed.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 1800, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 1210 typically includes at least one a camera sensor (CCD, CMOS etc.), a photo sensor (or image sensors), and a laser sensor.

Implementing the camera 1210 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The camera 1210 includes at least one of a first camera 1210*a* formed on a front surface of the terminal body, and a second camera 1210*b* formed on a rear surface of the terminal body.

The first camera 1210*a* can process image frames such as still or moving images obtained by the image sensor in a capture mode or a video call mode. The processed image frames can then be displayed on the display unit 1510 or stored in the memory 1700.

The second camera 1210*b* can include a plurality of lenses arranged along at least one line. The plurality of lenses may also be arranged in a matrix configuration. The cameras may be referred to as an "array camera." When the second camera 1210*b* is implemented as an array camera, images may be captured in various manners using the plurality of lenses and images with better qualities.

A flash 1240 is shown adjacent to the second camera 1210*b*. When an image of a subject is captured with the camera 1210*b*, the flash 1240 may illuminate the subject.

An electromagnetic wave generator (not shown) may be disposed near the second camera 1210*b*. The electromagnetic wave generator (not shown) emits generate electromagnetic waves when the second camera 1210*b* is activated.

The display unit 1510 is generally configured to output information processed in the mobile terminal 1000. For example, the display unit 1510 may display execution screen information of an application program executing at the mobile terminal 1000 or user interface (UI) and graphic user interface (GUI) information in response to the execution screen information.

In some embodiments, the display unit 1510 may be implemented as a stereoscopic display unit 1510 for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 1520 is generally configured to output audio data. Such audio data may be obtained from any of a number of different sources, such that the audio data may be received from the wireless communication unit 1100 or may have been stored in the memory 1700. The audio data may be output during modes such as a signal reception mode, a call mode, a record mode, a voice recognition mode, a broadcast reception mode, and the like. The audio output module 1520 can provide audible output related to a particular function (e.g., a call signal reception sound, a message reception sound, etc.) performed by the mobile terminal 1000. The audio output module 1520 may also be implemented as a receiver, a speaker, a buzzer, or the like.

The audio output module 1520 includes at least one of a first audio output module 1520*a* and a second audio output module 1520*b*. The first audio output module 1520*a* may be implemented as a receiver for transmitting a call sound to a user's ear, and the second audio output module 1520*b* may be implemented as a loud speaker for outputting various types of alarm sounds or play sounds of multimedia.

A haptic module 1530 can be configured to generate various tactile effects that a user feels, perceive, or otherwise experience. A typical example of a tactile effect generated by the haptic module 1530 is vibration. The strength, pattern and the like of the vibration generated by the haptic module 1530 can be controlled by user selection or setting by the controller. For example, the haptic module 1530 may output different vibrations in a combining manner or a sequential manner.

Besides vibration, the haptic module 1530 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 1530 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 1000.

An optical output module 1540 can output a signal for indicating an event generation using light of a light source. Examples of events generated in the mobile terminal 1000 may include message reception, call signal reception, a missed call, an alarm, a schedule notice, an email reception, information reception through an application, and the like.

A signal output by the optical output module 1540 may be implemented in such a manner that the mobile terminal emits monochromatic light or light with a plurality of colors. The signal output may be terminated as the mobile terminal senses that a user has checked the generated event, for example.

The interface unit 1600 serves as an interface for external devices to be connected with the mobile terminal 1000. For example, the interface unit 160 can receive data transmitted from an external device, receive power to transfer to elements and components within the mobile terminal 1000, or transmit internal data of the mobile terminal 100 to such external device. The interface unit 1600 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 1000 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 1000 via the interface unit 1600.

When the mobile terminal 1000 is connected with an external cradle, the interface unit 1600 can serve as a passage to allow power from the cradle to be supplied to the mobile terminal 1000 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 1700 can store programs to support operations of the controller 1800 and store input/output data (for example, phonebook, messages, still images, videos, etc.). The memory 1700 may store data related to various patterns of vibrations and audio which are output in response to touch inputs on the touch screen.

The memory 1700 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 1000 may also be operated in relation to a network storage device that performs the storage function of the memory 1700 over a network, such as the Internet.

The controller 1800 may typically control the general operations of the mobile terminal 1000. For example, the controller 1800 may set or release a lock state for restricting a user from inputting a control command with respect to applications when a status of the mobile terminal meets a preset condition.

The controller 1800 can also perform the controlling and processing associated with voice calls, data communications, video calls, and the like, or perform pattern recognition processing to recognize a handwriting input or a picture drawing input performed on the touch screen as characters or images, respectively. In addition, the controller 1800 can control one or a combination of those components in order to implement various exemplary embodiments disclosed herein.

The power supply unit 1900 receives external power or provide internal power and supply the appropriate power required for operating respective elements and components included in the mobile terminal 1000. The power supply unit 1900 may include a battery, which is typically rechargeable or be detachably coupled to the terminal body for charging.

The power supply unit 1900 may include a connection port. The connection port may be configured as one example of the interface unit 1600 to which an external charger for supplying power to recharge the battery is electrically connected.

As another example, the power supply unit 1900 may be configured to recharge the battery in a wireless manner without use of the connection port. In this example, the power supply unit 1900 can receive power, transferred from an external wireless power transmitter, using at least one of an inductive coupling method which is based on magnetic induction or a magnetic resonance coupling method which is based on electromagnetic resonance.

An accessory for protecting an appearance or assisting or extending the functions of the mobile terminal 1000 can also be provided on the mobile terminal 1000. As one example of an accessory, a cover or pouch for covering or accommodating at least one surface of the mobile terminal 1000 may be provided. The cover or pouch may cooperate with the display unit 1510 to extend the function of the mobile terminal 1000. Another example of the accessory is a touch pen for assisting or extending a touch input to a touch screen.

Various embodiments described herein may be implemented in a computer-readable medium, a machine-readable medium, or similar medium using, for example, software, hardware, or any combination thereof.

Figure 2A:
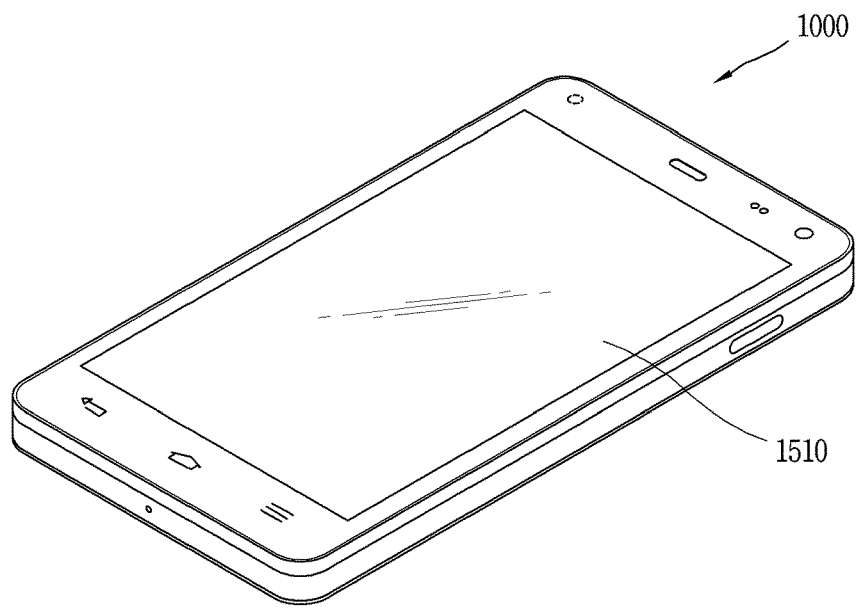
FIGS. 2A to 2C are conceptual views illustrating a foldable mobile terminal.
Figure 2B:
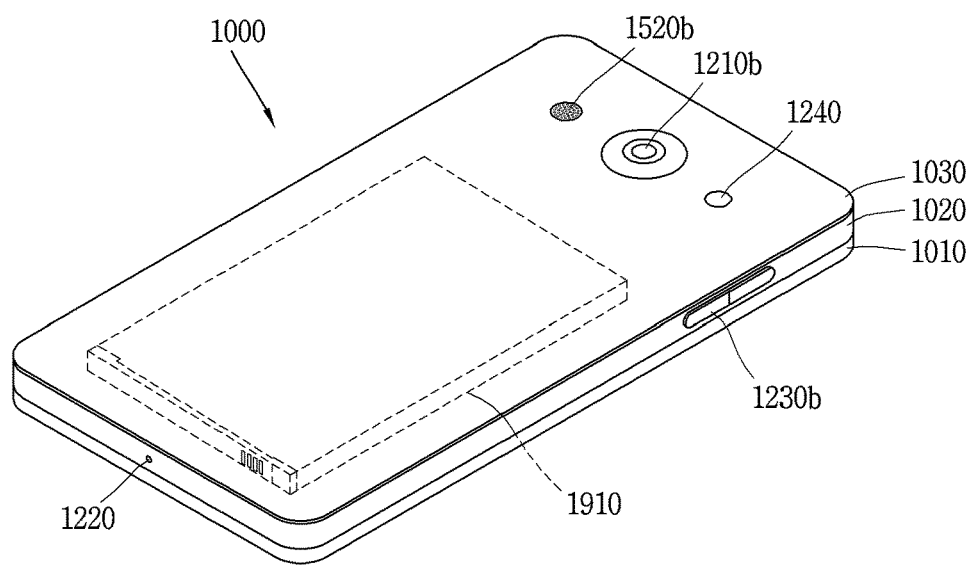
Figure 2C:
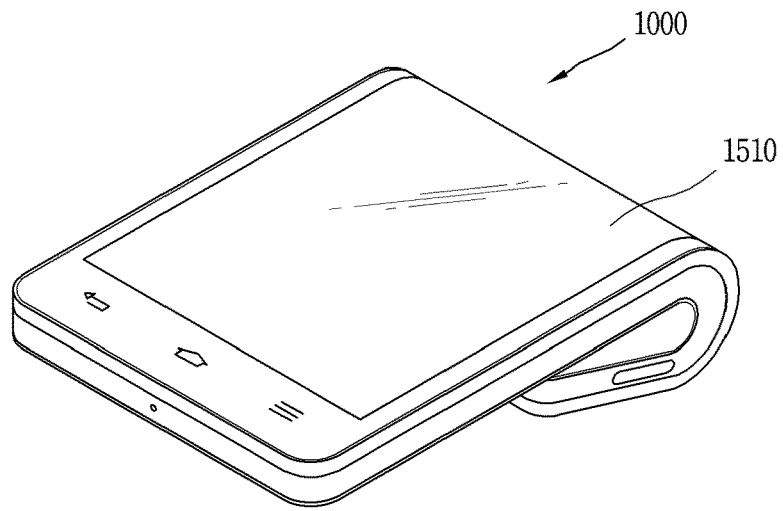
Figure 2D:
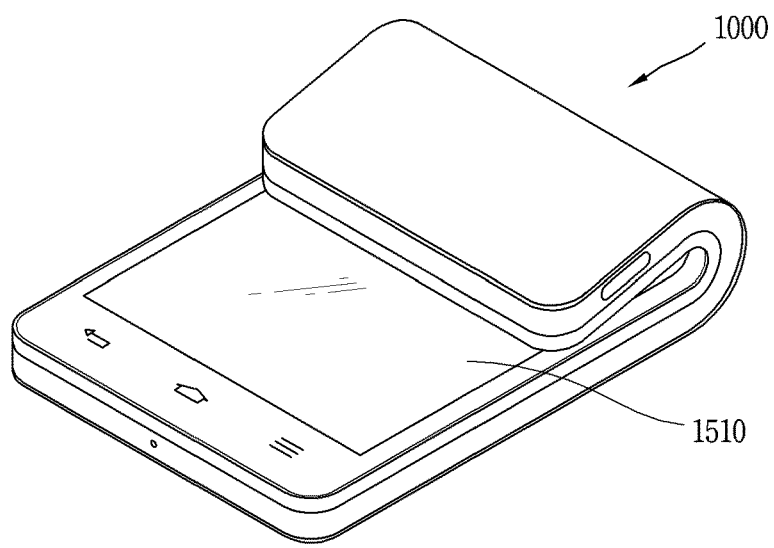

FIGS. 2A to 2C are conceptual views illustrating a foldable mobile terminal.

Referring now to FIGS. 2B and 2C, the mobile terminal 1000 is described with reference to a bar-type terminal body. However, the mobile terminal 1000 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 1000 will generally include a case (for example, frame, housing, cover, and the like) forming the appearance of the terminal. In this embodiment, the case is formed using a front case 1010 and a rear case 1020. Various electronic components are incorporated into a space formed between the front case 1010 and the rear case 1020. At least one middle case may be additionally positioned between the front case 1010 and the rear case 1020.

The display unit 1510 is shown located on the front side of the terminal body to output information. As illustrated, a window 1510' of the display unit 1510 may be mounted to the front case 1010 to form the front surface of the terminal body together with the front case 1010.

In some embodiments, electronic components may also be mounted to the rear case 1020. Examples of such electronic components include a detachable battery, an identification module, a memory card, and the like. Rear cover 1030 is shown covering the electronic components, and this cover may be detachably coupled to the rear case 1020. Therefore, when the rear cover 103 is detached from the rear case 1020, the electronic components mounted to the rear case 1020 are externally exposed.

As illustrated, when the rear cover 1030 is coupled to the rear case 1020, a side surface of the rear case 1020 is partially exposed. In some cases, upon the coupling, the rear case 1020 may also be completely shielded by the rear cover 1030. In some embodiments, the rear cover 1030 may include an opening for externally exposing a camera 1210b or an audio output module 1520b.

The cases 1010, 1020, 1030 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 1000 may be configured such that one case forms the inner space. In this example, a mobile terminal 1000 having a uni-body is formed in such a manner that synthetic resin or metal extends from a side surface to a rear surface.

If desired, the mobile terminal 1000 may include a waterproofing unit (not shown) for preventing introduction of water into the terminal body. For example, the waterproofing unit may include a waterproofing member which is located between the window 1510' and the front case 1010, between the front case 1010 and the rear case 1020, or between the rear case 1020 and the rear cover 1030, to hermetically seal an inner space when those cases are coupled.

FIGS. 2B and 2C depict certain components as arranged on the mobile terminal. However, it is to be understood that alternative arrangements are possible and within the teachings of the instant disclosure. Some components may be omitted or rearranged. For example, the first manipulation unit 1230a may be located on another surface of the terminal body, and the second audio output module 1520b may be located on the side surface of the terminal body.

The display unit 1510 outputs information processed in the mobile terminal 1000. The display unit 1510 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 1510 may be implemented using two display devices, which can implement the same or different display technology. For instance, a plurality of the display units 1510 may be arranged on one side, either spaced apart from each other, or these devices may be integrated, or these devices may be arranged on different surfaces.

The display unit 1510 may also include a touch sensor which senses a touch input received at the display unit. When a touch is input to the display unit 1510, the touch sensor may be configured to sense this touch and the controller 1800, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 1510' and a display on a rear surface of the window 1510', or a metal wire which is patterned directly on the rear surface of the window 1510'. Alternatively, the touch sensor may be integrally formed with the display. For example, the touch sensor may be disposed on a substrate of the display or within the display.

The display unit 1510 may also form a touch screen together with the touch sensor. Here, the touch screen may serve as the user input unit 1230 (see FIG. 1). Therefore, the touch screen may replace at least some of the functions of the first manipulation unit 1230a.

The first audio output module 1520a may be implemented as a receiver for transmitting a call sound to a user's ear, and the second audio output module 1520b may be implemented as a loud speaker for outputting various types of alarm sounds or play sounds of multimedia.

The window 1510' of the display unit 1510 will typically include an aperture to permit audio generated by the first audio output module 1520a to pass. One alternative is to allow audio to be released along an assembly gap between the structural bodies (for example, a gap between the window 1510' and the front case 101'). In this case, a hole independently formed to output audio sounds may not be seen or is otherwise hidden in terms of appearance, thereby further simplifying the appearance and manufacturing of the mobile terminal 1000.

The optical output module 1540 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 1540 to stop the light output.

The first camera 1210a can process image frames such as still or moving images obtained by the image sensor in a capture mode or a video call mode. The processed image frames can then be displayed on the display unit 1510 or stored in the memory 1700.

The first and second manipulation units 1230a and 1230b are examples of the user input unit 1230, which may be manipulated by a user to provide input to the mobile terminal 1000. The first and second manipulation units 1230a and 1230b may also be commonly referred to as a manipulating portion, and may employ any tactile method that allows the user to perform manipulation such as touch, push, scroll, or the like. The first and second manipulation units 1230a and 1230b may also employ any non-tactile method that allows the user to perform manipulation such as proximity touch, hovering, or the like.

FIG. 2 illustrates the first manipulation unit 1230a as a touch key, but possible alternatives include a mechanical key, a push key, a touch key, and combinations thereof.

Input received at the first and second manipulation units 1230a and 1230b may be used in various ways. For example, the first manipulation unit 1230a may be used by the user to provide an input to a menu, home key, cancel, search, or the like, and the second manipulation unit 1230b may be used by the user to provide an input to control a volume level being output from the first or second audio output modules 1520a or 1520b, to switch to a touch recognition mode of the display unit 1510, or the like.

As another example of the user input unit 1230, a rear input unit (not shown) may be located on the rear surface of the terminal body. The rear input unit can be manipulated by a user to provide input to the mobile terminal 1000. The input may be used in a variety of different ways. For example, the rear input unit may be used by the user to provide an input for power on/off, start, end, scroll, control volume level being output from the first or second audio output modules 1520a or 1520b, switch to a touch recognition mode of the display unit 1510, and the like. The rear input unit may be configured to permit touch input, a push input, or combinations thereof.

The rear input unit may be located to overlap the display unit 1510 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 1230a in the rear input unit. As such, in situations where the first manipulation unit 1230a is omitted from the front side, the display unit 1510 can have a larger screen.

As a further alternative, the mobile terminal 1000 may include a finger scan sensor which scans a user's fingerprint. The controller 1800 can then use fingerprint information sensed by the finger scan sensor as part of an authentication procedure. The finger scan sensor may also be installed in the display unit 1510 or implemented in the user input unit 1230.

The microphone 1220 is shown located at an end of the mobile terminal 1000, but other locations are possible. If desired, multiple microphones may be implemented, with such an arrangement permitting the receiving of stereo sounds.

The interface unit 1600 may serve as a path allowing the mobile terminal 1000 to interface with external devices. For example, the interface unit 1600 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 1000. The interface unit 1600 may be implemented in the form of a socket for accommodating an external card, such as Subscriber Identification Module (SIM), User Identity Module (UIM), or a memory card for information storage.

The second camera 1210b is shown located at the rear side of the terminal body and includes an image capturing direction that is substantially opposite to the image capturing direction of the first camera unit 1210a. If desired, second camera 1210a may alternatively be located at other locations, or made to be moveable, in order to have a different image capturing direction from that which is shown.

The second camera 1210b can include a plurality of lenses arranged along at least one line. The plurality of lenses may also be arranged in a matrix configuration. The cameras may be referred to as an "array camera." When the second camera 1210b is implemented as an array camera, images may be captured in various manners using the plurality of lenses and images with better qualities.

A flash 1240 is shown adjacent to the second camera 1210b. When an image of a subject is captured with the camera 1210b, the flash 1240 may illuminate the subject.

The second audio output module 1520b can be located on the terminal body. The second audio output module 1520b may implement stereophonic sound functions in conjunction with the first audio output module 1520a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 1110 may be retractable into the terminal body. Alternatively, an antenna may be formed using a film attached to an inner surface of the rear cover 1030, or a case that includes a conductive material.

A power supply unit 1900 for supplying power to the mobile terminal 1000 may include a battery 1910, which is mounted in the terminal body or detachably coupled to an outside of the terminal body. The battery 1910 may receive power via a power source cable connected to the interface unit 1600. Also, the battery 1910 can be recharged in a wireless manner using a wireless charger. Wireless charging may be implemented by magnetic induction or electromagnetic resonance.

The rear cover 1030 is shown coupled to the rear case 1020 for shielding the battery 1910, to prevent separation of the battery 1910, and to protect the battery 1910 from an external impact or from foreign material. When the battery 1910 is detachable from the terminal body, the rear case 1030 may be detachably coupled to the rear case 1020.

An accessory for protecting an appearance or assisting or extending the functions of the mobile terminal 1000 can also be provided on the mobile terminal 1000. As one example of an accessory, a cover or pouch for covering or accommodating at least one surface of the mobile terminal 1000 may be provided. The cover or pouch may cooperate with the display unit 1510 to extend the function of the mobile terminal 1000. Another example of the accessory is a touch pen for assisting or extending a touch input to a touch screen.

The mobile terminal according to an embodiment of the present invention is provided with a display unit 1510 which is a type of display that is deformable by an external force. This deformation, which includes display unit 1510 and other components of mobile terminal 1000, may include any of curving, bending, folding, twisting, rolling, and combinations thereof. The deformable display unit 1510 may also be referred to as a "flexible display unit." In some implementations, the flexible display unit 1510 may include a general flexible display, electronic paper (also known as e-paper), and combinations thereof.

The flexible display of mobile terminal 1000 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 1510 is not deformed (for example, in a state with an infinite radius of curvature and referred to as a first state), a display region of the flexible display unit 1510 includes a generally flat surface. When in a state that the flexible display unit 1510 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 1510 may be a curved state (for example, a state of being curved from up to down or from right to left), instead of being in flat state. In this embodiment, when an external force is applied to the flexible display unit 1510, the flexible display unit 1510 may transition to the second state such that the flexible display unit is deformed into the flat state (or a less curved state) or into a more curved state.

If desired, the flexible display unit 1510 may implement a flexible touch screen using a touch sensor in combination with the display. When a touch is received at the flexible touch screen, the controller 1800 (refer to FIG. 1) can execute certain control corresponding to the touch input. In general, the flexible touch screen is configured to sense touch and other input while in both the first and second states.

One option is to configure the mobile terminal 1000 to include a deformation sensor which senses the deforming of the flexible display unit 1510. The deformation sensor may be included in the sensing unit 1400 (refer to FIG. 1).

The deformation sensor may be located in the flexible display unit 1510 or the case to sense information related to the deforming of the flexible display unit 1510. Examples of such information related to the deforming of the flexible display unit 1510 may be a deformed direction, a deformed degree, a deformed position, a deformed amount of time, an acceleration that the deformed flexible display unit 1510 is restored, and the like. Other possibilities include most any type of information which can be sensed in response to the curving of the flexible display unit or sensed while the flexible display unit 1510 is transitioning into, or existing in, the first and second states.

In some embodiments, controller 1800 or other component can change information displayed on the flexible display unit 1510, or generate a control signal for controlling a function of the mobile terminal 1000, based on the information related to the deforming of the flexible display unit 1510. Such information is typically sensed by the deformation sensor.

The mobile terminal 1000 is shown having a case for accommodating the flexible display unit 1510. The case can be deformable together with the flexible display unit 1510, taking into account the characteristics of the flexible display unit 1510.

A battery (not shown in this figure) located in the mobile terminal 1000 may also be deformable in cooperation with the flexible display unit 1510, taking into account the characteristic of the flexible display unit 1510. One technique to implement such a battery is to use a stack and folding method of stacking battery cells.

The deformation of the flexible display unit 1510 not limited to perform by an external force. For example, the flexible display unit 1510 can be deformed into the second state from the first state by a user command, application command, or the like.

Referring to FIG. 2B, the mobile terminal 1000 according to one embodiment may be folded to externally expose the display unit 1510. In this case, a center of a curvature of the display unit 1510 is formed at a rear area of the display unit 1510. When a surface where the display unit is formed in the body portion of the mobile terminal 1000 is defined as a front surface and a surface facing the front surface is defined as a rear surface, an end portion of the body portion of the folded mobile terminal 1000 may be fixed to the rear surface.

Referring to FIG. 2C, the mobile terminal 1000 according to one embodiment may be folded to be formed inside one area of the display unit 1510. In this case, the center of the curvature of the display unit 1510 is formed at a front area of the display unit 1510.

The mobile terminal 1000 according to the present invention is implemented to be folded in any one of a front direction and a rear direction as shown in FIGS. 2B and 2C. Hereinafter, a detailed structure that may fold the display unit 1510 will be described.

Figure 3A:
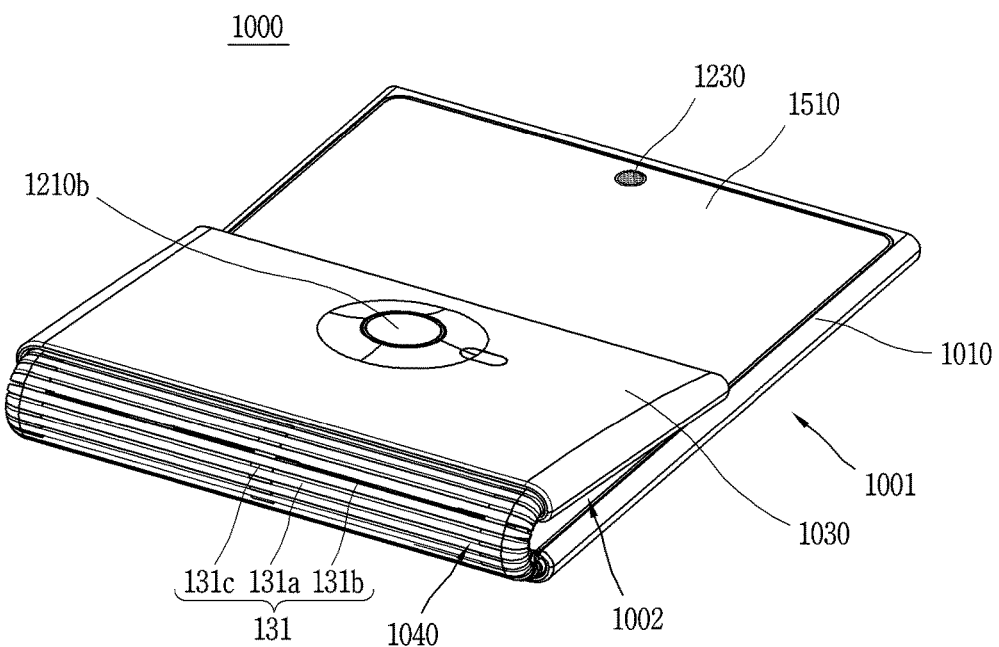
FIGS. 3A to 3C are conceptual views illustrating a folding unit of a mobile terminal according to one embodiment of the present invention.
Figure 3B:
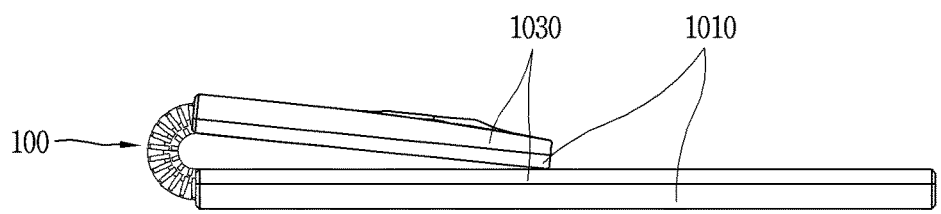
Figure 3C:
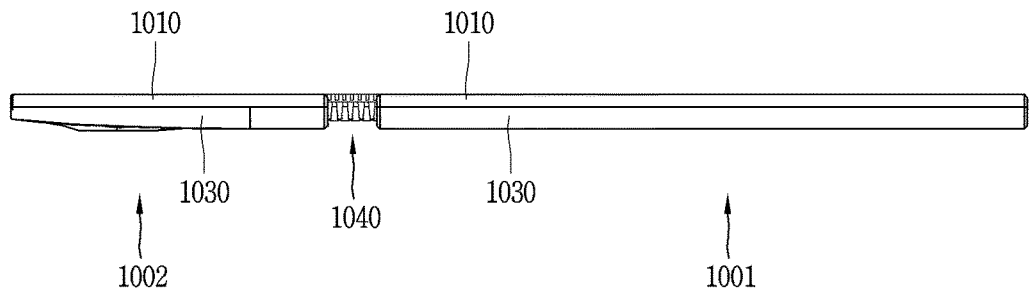

FIGS. 3A to 3C are conceptual views illustrating a folding unit of a mobile terminal according to one embodiment of the present invention. FIGS. 3A and 3B are conceptual views illustrating the mobile terminal 1000 viewed in different directions in a state that the mobile terminal 1000 is closed, and is a conceptual view illustrating the mobile terminal 1000 viewed in a lateral direction in a state that the mobile terminal 1000 is opened.

The mobile terminal according to this embodiment is provided with the display unit 1510 provided on a front surface of the body portion, and includes a first folding unit 100 formed to fold the display unit 1510 toward the front of the display unit 1510. The body portion of the mobile terminal 1000 includes a first area 1001, a second area 1002, and a deformation area 1040. The deformation area 1040 corresponds to a predetermined deformation area of the display unit 1510. The deformation area 1040 is formed to make a curved surface or a plane by means of an external force.

The body portion according to this embodiment includes a front case 1010 supporting the display unit 1510, and the rear cover 1030. The front case 1010 and the rear cover 1030 are divided into the first area 1001 and the second area 1002, respectively. The front case 1010 is comprised of first and second members arranged to form a spaced area corresponding to the deformation area 1040, and the rear cover 1030 is comprised of first and second members arranged to form a spaced area corresponding to the deformation area 1040. The first folding unit 100 is provided in the deformation area 1040 to vary an angle between the first and second areas 1001 and 1002.

One area of the first folding unit 100 is exposed by the front case 1010 and the rear cover 1030. Therefore, the deformation area 1040 has a structure more recessed than the front case 1010 and the rear cover 1030. The first folding unit 100 is arranged to adjoin a lower surface of the display unit 1510 and deformed to make a plane and a curved surface by means of an external force. Hereinafter, a detailed structure of the first folding unit 100 will be described.

FIGS. 4A to 4D are conceptual views illustrating a structure of a first folding unit of a mobile terminal shown in FIG. 3A. The first folding unit 100 includes a deformation support unit 140, a deformation sliding unit 130, and first and second frames 110 and 120.

Figure 4A:
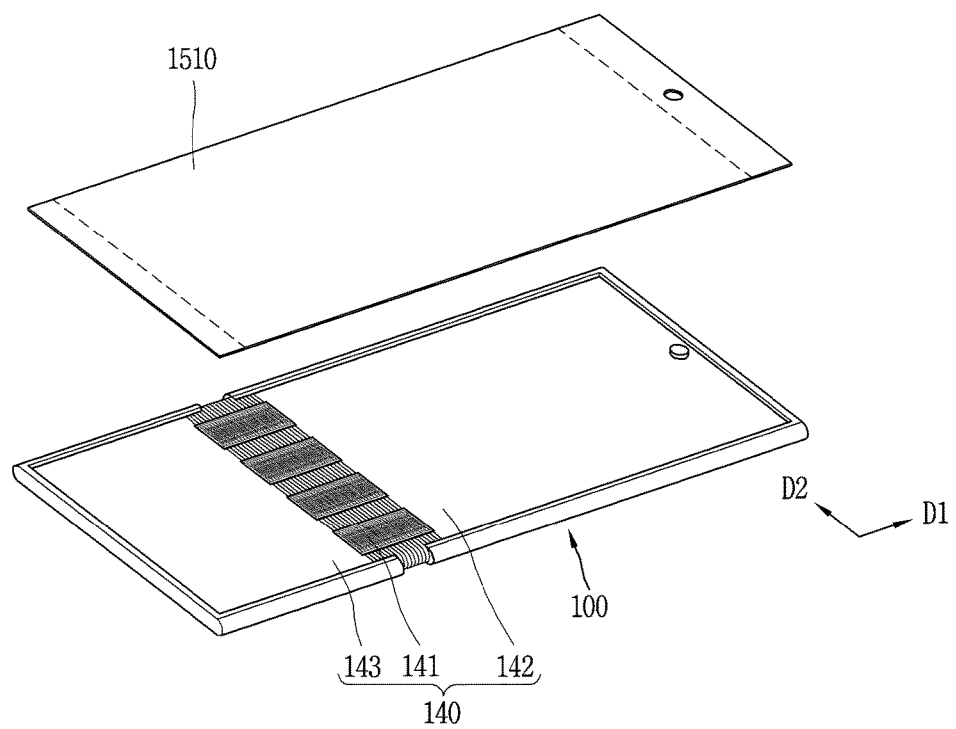
FIGS. 4A to 4D are conceptual views illustrating a structure of a first folding unit of a mobile terminal shown in FIG. 3A.
Figure 4B:
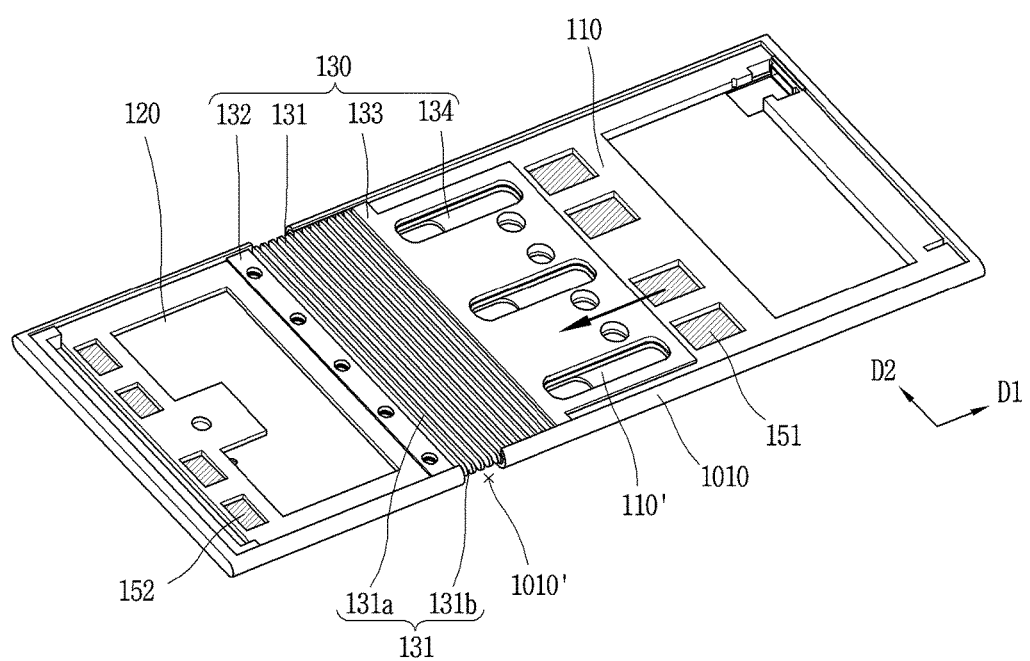

Referring to FIG. 4A, the deformation support unit 140 is formed to support the display unit 1510. The deformation support unit 140 includes a first support unit 142 corresponding to the first area 1001 of the mobile terminal 1000 and a second support unit 143 corresponding to the second area 1002 of the mobile terminal 1000. A first living hinge unit 141 is formed between the first and second support units 142 and 143.

The first living hinge unit 141 includes a plurality of slits and a plurality of ribs, which are extended along a first direction D1 which is a length direction of the mobile terminal 1000 and arranged in a second direction D2 crossing the first direction D1. The first and second areas 1001 and 1002 of the mobile terminal 1000 may be bent based on the first living hinge unit 141.

The deformation sliding unit 130 deformed to bend the body portion of the mobile terminal 1000 by the external force is formed below the deformation support unit 140. The deformation sliding unit 130 is arranged between the first and second frames 110 and 120.

The first and second frames 110 and 120 are arranged to respectively correspond to the insides of the first and second areas 1001 and 1002 of the mobile terminal 1000. Each of the first and second frames 110 and 120 includes a packaging space that may package various electronic parts of the mobile terminal 1000. Also, a plurality of first magnet units 151 are formed at one area adjacent to the deformation sliding unit 130 of the first frame 110, and a plurality of second magnet units 152 corresponding to the first magnet units 151 are formed at one area adjacent to the deformation sliding unit 130 of the second frame 120. The first and second magnet units 151 and 152 have polarities opposite to each other. Therefore, the mobile terminal 1000 may be fixed by attraction of the first and second magnet units 151 and 152 in a state that the mobile terminal 1000 is folded.

A first connecting unit 132 of the deformation sliding unit 130 is fixed to the second frame 120. The deformation sliding unit 130 may include a plurality of securing members arranged in the second direction D2 to fix the deformation sliding unit 130 to the second frame 120.

Meanwhile, a second connecting unit 133 of the deformation sliding unit 130 is slidably connected to the first frame 110. The second connecting unit 133 further includes a guide hole 134 extended along the first direction D1 as much as a predetermined length, and the first frame 110 includes a guide protrusion 110' fitted into the guide hole 134. That is, the deformation sliding unit 130 may be slid along the first direction D1 as much as a predetermined range based on the first frame 110.

Referring to FIG. 4A again, the first living hinge unit 141 of the deformation support unit 140 may be viewed through a second living hinge unit 131 exposed in a state that the mobile terminal 1000 is folded.

The second living hinge unit 131 is formed between the first and second connecting units 132 and 133. The second living hinge unit 131 is extended along the second direction D1, and is comprised of a plurality of ribs 131a arranged along the first direction D1. Since the plurality of ribs 131a are arranged at predetermined intervals, the second living hinge unit 131 may form a curved surface by means of a spaced area 131b between the ribs through an external force. Both ends of the plurality of ribs 131a of the second living hinge unit 131 have a bent shape to surround the side of the mobile terminal 1000. The plurality of ribs 131a are connected to one another by a plurality of connecting ribs 131c extended along the first direction D1 in the unfolded state. The connecting ribs 131c may be made of an elastic material that may be deformed by means of the external force.

Some ribs of the second living hinge unit 131 are exposed by the front case 1010 and the rear cover 1030.

Meanwhile, the deformation support unit 140 is arranged on the deformation sliding unit 130 such that the first living hinge unit 141 corresponds to the second living hinge unit 131. As a result, the first and second living hinge units 141 and 131 may be deformed to shapes corresponding to each other by the external force.

If the external force is applied to the second area 1002 based on the first area 1001, the guide protrusion 110' is moved along the guide hole 134, whereby the distance between the first and second frames 110 and 120 is increased. As a result, the exposed area of the second living hinge unit 131 is increased.

If the second living hinge unit 131 is exposed to form a curved surface, a folding state that some areas of the first and second areas 1001 and 1002 are superimposed on each other is formed while the deformed area of the display unit 1510 is forming the curved surface.

By contrast, if the first and second areas 1001 and 1002 are unfolded by the external force, the second living hinge unit 131 is again received in the first frame 110, whereby the deformation sliding unit 130 is moved to be received in the first frame 110.

Figure 4C:
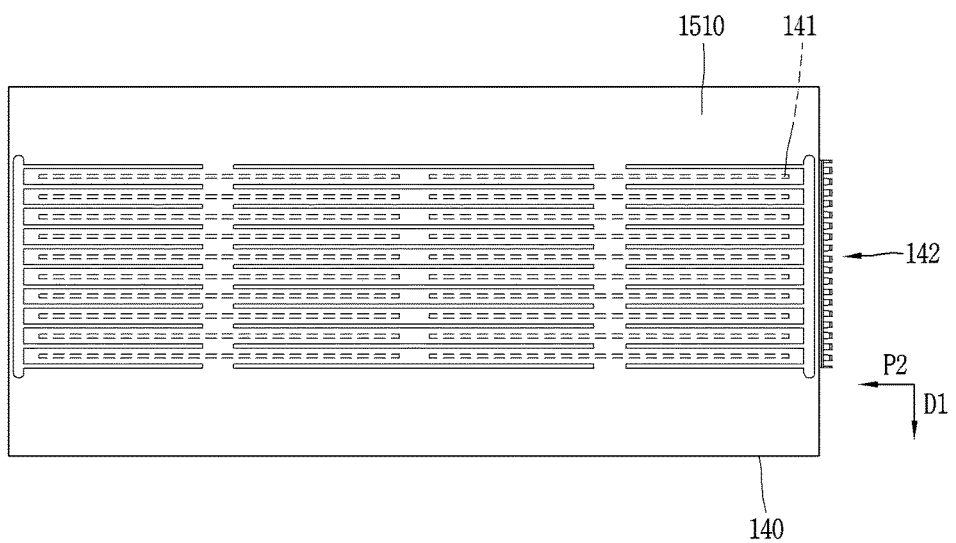
Figure 4D:
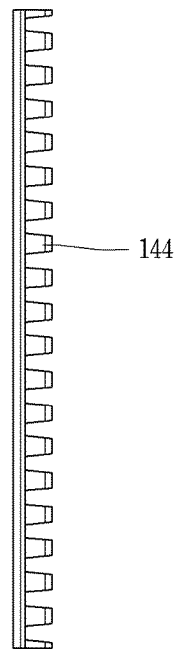

Meanwhile, referring to FIGS. 4C and 4D, the display unit 1510 includes a folding protrusion 142 formed at one area of the side. FIG. 4C is a conceptual view illustrating a state that the deformation support unit 140 and the display unit 1510 are superimposed on each other.

The display unit 1510 is formed to surround a display panel outputting an image and an edge of the display panel, and includes a support frame supporting the display panel. The folding protrusion 142 is formed at some area corresponding to the first living hinge unit 141 of the support frame. The folding protrusion 142 is comprised of a plurality of protrusion shapes 144 arranged in parallel along the first direction D1. The folding protrusion 142 may prevent the display unit 1510 from being wrinkled or damaged as the distance between the respective protrusions is deformed damaged if the display unit 1510 is bent.

Figure 5A:
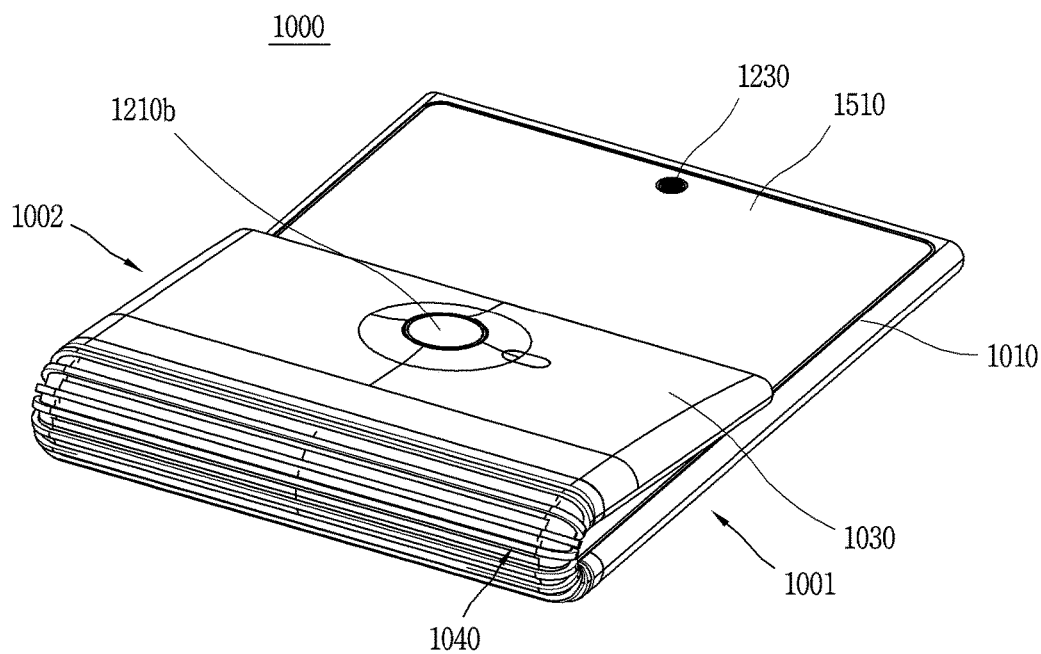
FIGS. 5A to 5C are conceptual views illustrating a folding unit of a mobile terminal according to one embodiment of the present invention.
Figure 5B:
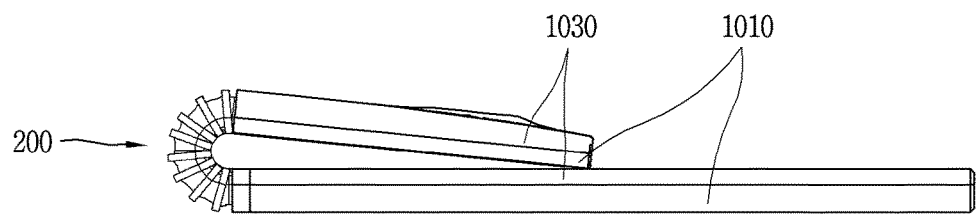
Figure 5C:
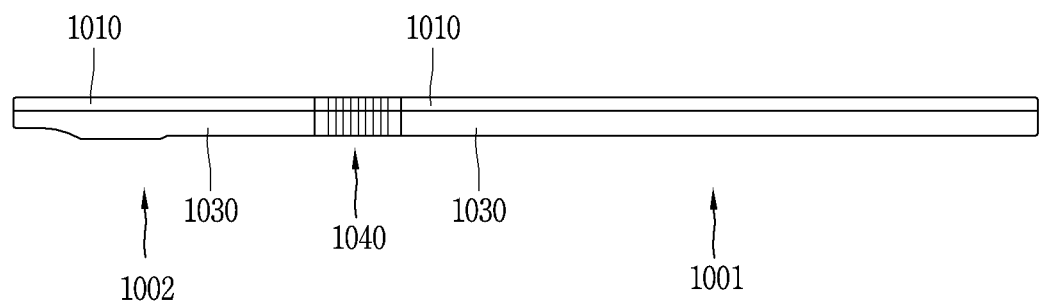
Figure 6A:
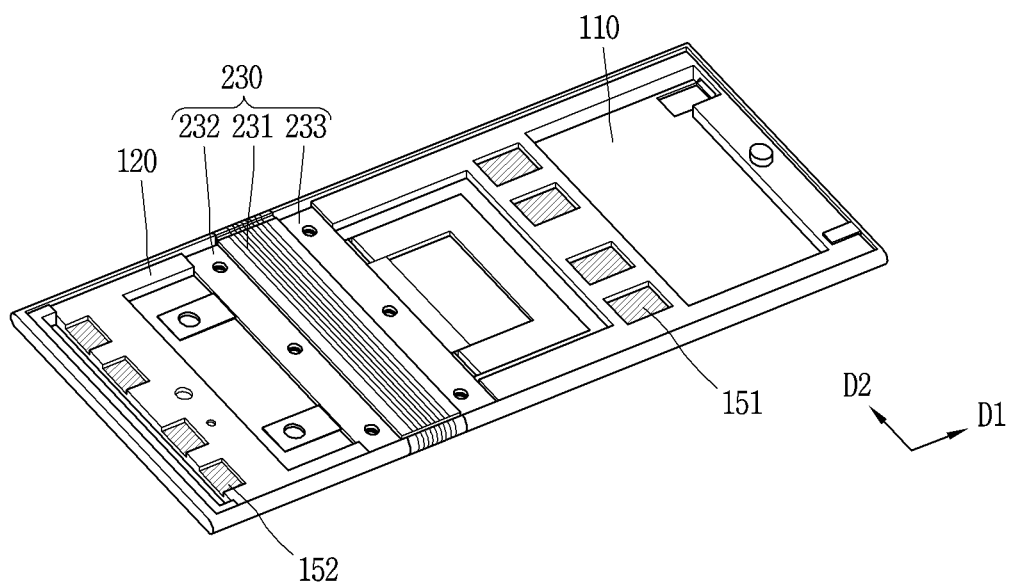
FIGS. 6A to 6C are conceptual views illustrating a structure of a deformation sliding unit.
Figure 6B:
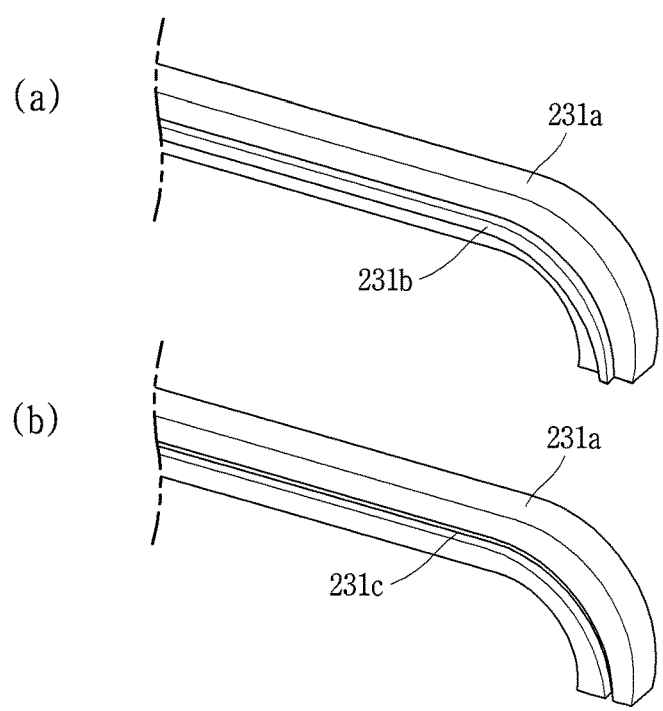
Figure 6C:
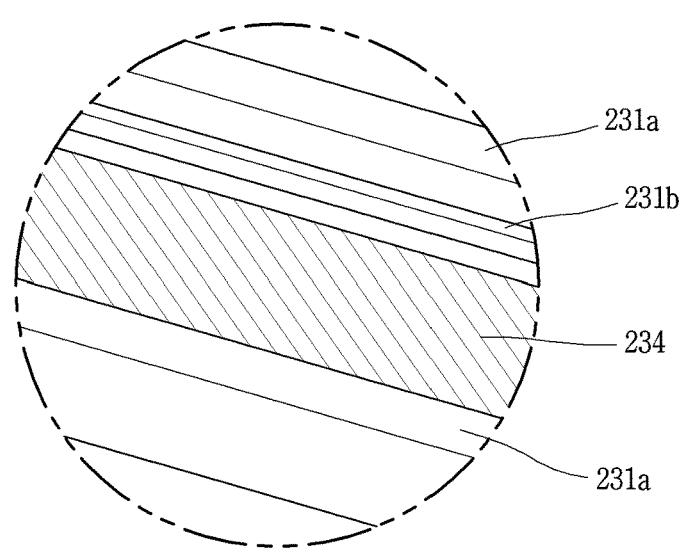

FIGS. 5A to 5C are conceptual views illustrating a folding unit of a mobile terminal according to one embodiment of the present invention, and FIGS. 6A to 6C are conceptual views illustrating a structure of a deformation sliding unit.

FIGS. 5A and 5B are conceptual views illustrating the mobile terminal 1000 viewed in different directions in a state that the mobile terminal 1000 is closed, and FIG. 5C is a conceptual view illustrating the mobile terminal 1000 viewed in a lateral direction in a state that the mobile terminal 1000 is opened. The elements of the mobile terminal 1000 according to this embodiment are substantially the same as those of the mobile terminal 1000 according to the embodiment of FIG. 3A except a deformation sliding unit 230. Therefore, the same reference numerals are given to same or similar elements, and a redundant description will be omitted.

Referring to FIGS. 5A and 5B, one area of the deformation sliding unit 230 of a second folding unit 200 according to this embodiment is formed to constitute one surface with an external surface of the front case 1010 and an external surface of the rear cover 1030 in the unfolded state. Hereinafter, a detailed structure of the second folding unit 200 will be described.

The second folding unit 200 includes the deformation support unit 140, a deformation fixing unit 230, and first and second frames 110 and 120. Since the deformation support unit 140 and the first and second frames 110 and 120 are substantially the same as those of the mobile terminal 1000 according to the embodiment of FIG. 3A, their redundant description will be omitted.

Referring to FIGS. 6A to 6C, the deformation fixing unit 230 includes a first connecting unit 232 fixed to the second frame 120 and a second connecting unit 233 fixed to the first frame 110. The deformation fixing unit 230 is provided with a third living hinge unit 231 formed between the first and second connecting units 232 and 233, having a length varied by the external force. The third living hinge unit 231 includes a plurality of ribs 231a, and a fitting protrusion 231b and a fitting groove 231c, which are formed at each of the plurality of ribs 231a.

Referring to FIG. 6C, the third living hinge unit 231 includes the plurality of ribs 231a, the fitting protrusion 231b projected from one surface of the plurality of ribs 231a, and the fitting groove 231c recessed from the other surface of the ribs 231a such that the fitting protrusion 231b of the ribs 231a of the other surface is inserted into the fitting groove 231c. Each of the plurality of ribs 231a is extended along the second direction D2, and includes a curved surface structure surrounding the side of the mobile terminal 1000.

The fitting protrusion 231b is extended in the second direction D2 as much as a predetermined length. The fitting protrusion 231b of the rib 231a is movably inserted into the fitting groove 231c of another adjacent rib 231a.

Referring to FIGS. 5A and 5C again, the plurality of ribs 231a of the third living hinge unit 231 are externally exposed in a state that the first and second areas 1001 and 1002 are flat. In a state that the plurality of fitting protrusions 231b are all fitted into the plurality of fitting grooves 231c, the external surface of the plurality of ribs 231a are formed to constitute one surface with the external surface of the rear cover 1030.

If the deformation area 1040 forms a curved surface by means of the external force, the plurality of ribs 231a of the third living hinge unit 231 are spaced apart from one another. The fitting protrusion 231b is detached from the fitting groove 231c.

Referring to FIG. 6C, an elastic support member 234 made of an elastic material is formed below the living hinge unit 231. The elastic support member 234 may be made of a sheet of an elastic material that may be deformed by an external force. The elastic support member 234 is elastically deformed by deformation of the third living hinge unit 231.

In the folded state, the elastic support member 234 is exposed between the respective ribs 231a. Even though the respective ribs 231a are spaced apart from each other by the elastic support member 234, the insides of the ribs are not exposed.

However, if the plurality of fitting protrusions 231b and the plurality of fitting grooves 231a are formed by a predetermined area, the inside of the third living hinge unit 231 may not be exposed by the fitting protrusions 231b in the folded state. A hanging protrusion may be formed at the end of the fitting protrusion 231b so as not to be detached from the fitting groove 231c.

According to this embodiment, since the folded state is formed in a state that both ends of the third living hinge unit are fixed to the first and second areas, an inner space for movement of the ribs is not required, whereby the thickness of the mobile terminal may be minimized. Also, since both ends of the third living hinge unit form the same surface as the external surface of the mobile terminal, simpler appearance of the mobile terminal may be provided.

Figure 7A:
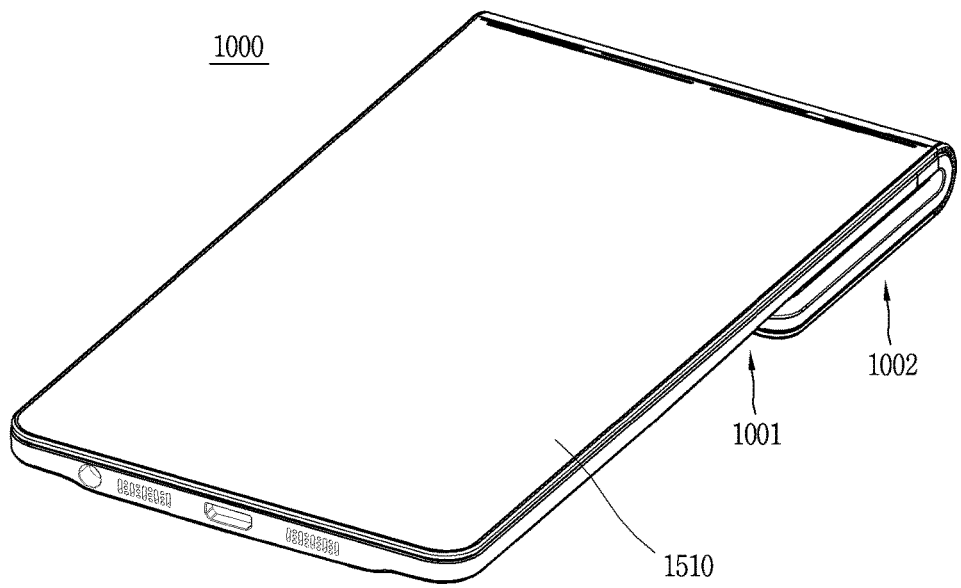
FIGS. 7A and 7B are conceptual views illustrating a structure of a mobile terminal according to another embodiment of the present invention.
Figure 7B:
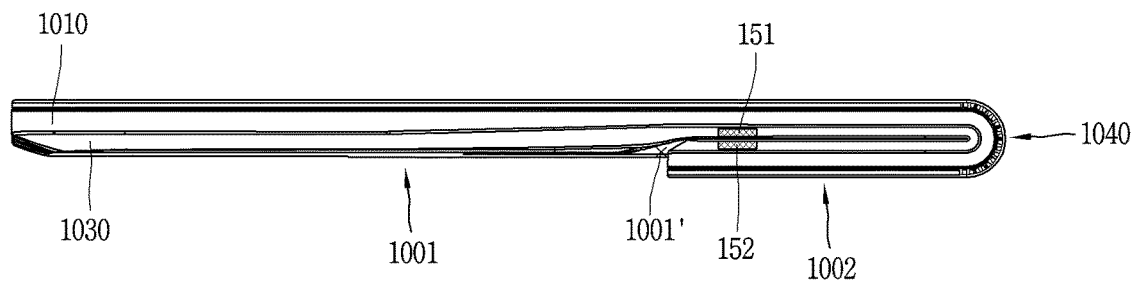

FIGS. 7A and 7B are conceptual views illustrating a structure of a mobile terminal according to another embodiment of the present invention. The elements of the mobile terminal 1000 according to this embodiment are substantially the same as those of the mobile terminal 1000 shown in FIGS. 3A to 3C except a structure of a first area 1001 of a body portion and a third folding unit 330. Therefore, the same reference numerals are given to same or similar elements, and a redundant description will be omitted. The display unit 1510 of the mobile terminal 1000 according to this embodiment is formed to be folded toward a rear surface of the mobile terminal 1000.

Figure 7C:
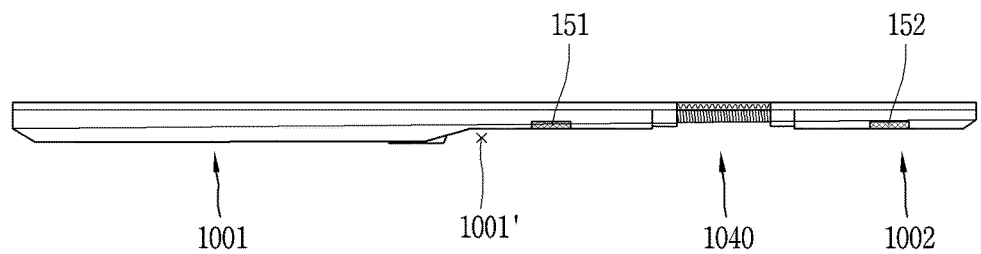

Referring to FIGS. 7B and 7C, the body portion includes a receiving portion 1001' formed as one area of the first area 1001 of the body portion, which is adjacent to the deformation area 1040, is recessed. That is, the receiving portion 1001' has a thickness narrower than that of the other area of the first area 1001.

The first magnet unit 151 is formed inside the rear cover 1030 corresponding to the receiving portion 1001', and the second magnet unit 152 corresponding to the first magnet unit 151 is formed inside the rear cover 1030 of the second area 1002. The first and second magnet units 151 and 152 are formed to have their respective polarities different from each other.

The second area 1002 is partially received in the receiving portion 1001' in the folded state. In the folded state, the first and second areas 1001 and 1002 are fixed by attraction caused by the first and second magnet units 151 and 152.

Figure 8A:
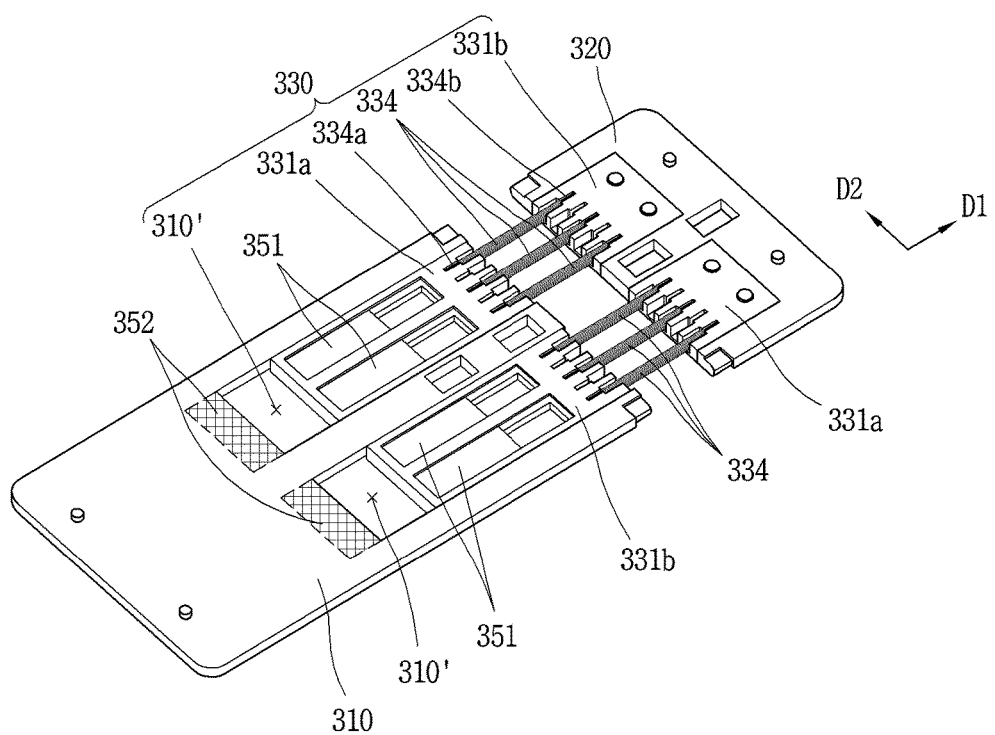
FIGS. 8A and 8B are conceptual views illustrating a third folding unit.
Figure 8B:
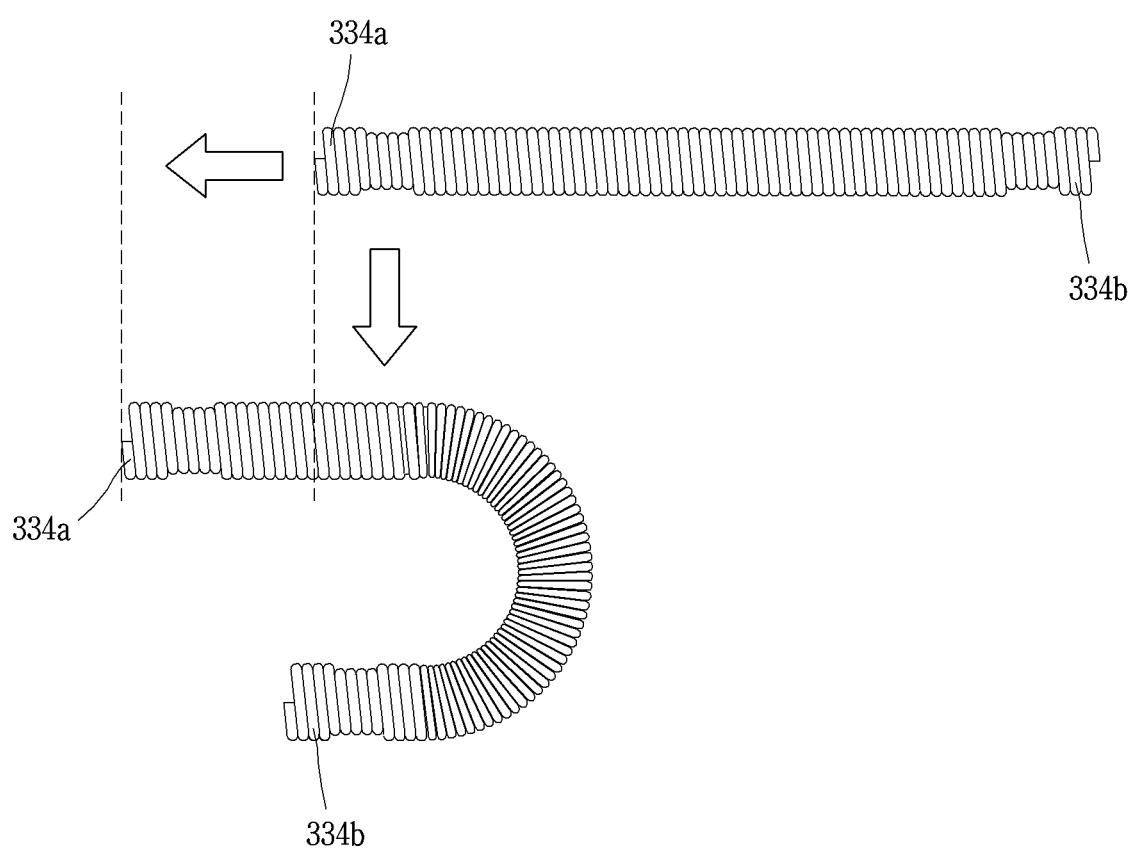

FIGS. 8A and 8B are conceptual views illustrating a third folding unit. FIG. 8A is a conceptual view illustrating a structure of the third folding unit in an unfolded state, and FIG. 8B is a conceptual view illustrating a state of a deformation unit in a folded state and an unfolded state.

The third folding unit 330 includes the deformation support unit 140, a deformation fixing unit 330, and first and second frames 310 and 320. Since the deformation support unit 140 is substantially the same as that of the mobile terminal 1000 according to the embodiment of FIG. 3A, its redundant description will be omitted. The deformation elastic unit 330 is arranged below the deformation support unit 140.

The deformation elastic unit 330 includes a first connecting unit 331a fixed to the first frame 310, a second connecting unit 331b fixed to the second frame 320, and an elastic unit 334 arranged between the first and second connecting units 331a and 331b. The elastic unit 334 is extended along the first direction D1, and may be made of a plurality of coil spring members arranged along the second direction D2. The first and second connecting units 331a and 331b may be formed on sections facing each other, and may be provided with fixing grooves for respectively fixing first and second ends 334a and 334b of the plurality of spring members. The third folding unit 330 is provided with a pair of first and second connecting units 331a and 331b. The spring members provide an elastic force to allow the body portion to maintain the unfolded state.

The first frame 310 includes a moving hole 310' formed along the first direction D1 to move the first connecting unit 331a. If the unfolded state is switched to the folded state, the first connecting unit 331a is moved along the moving hole 310' to be far away from the second connecting unit 331b.

Meanwhile, a third magnet unit 351 is received in the first connecting unit 331a, and a fourth magnet unit 352 having the same polarity as that of the third magnet unit 351 is built on one surface of the moving hole 310'. The third folding unit 330 maintains the unfolded state by means of a repulsive force generated by the third and fourth magnet units 351 and 352.

Referring to FIG. 8C, if the elastic unit 334 of the third folding unit 330 is bent by the external force, the first connecting unit 331a to which the first end 334 is fixed is moved along the moving hole 310'.

According to this embodiment, the mobile terminal is bent using the deformable coil spring members, and the unfolded state is maintained by the magnet units, which have the same polarity as that of an elastic force of the coil spring members and face each other. Also, if the folded state is made by an external force of a user, the folded state is maintained using the magnet units having their respective polarities different from each other.

Figure 9A:
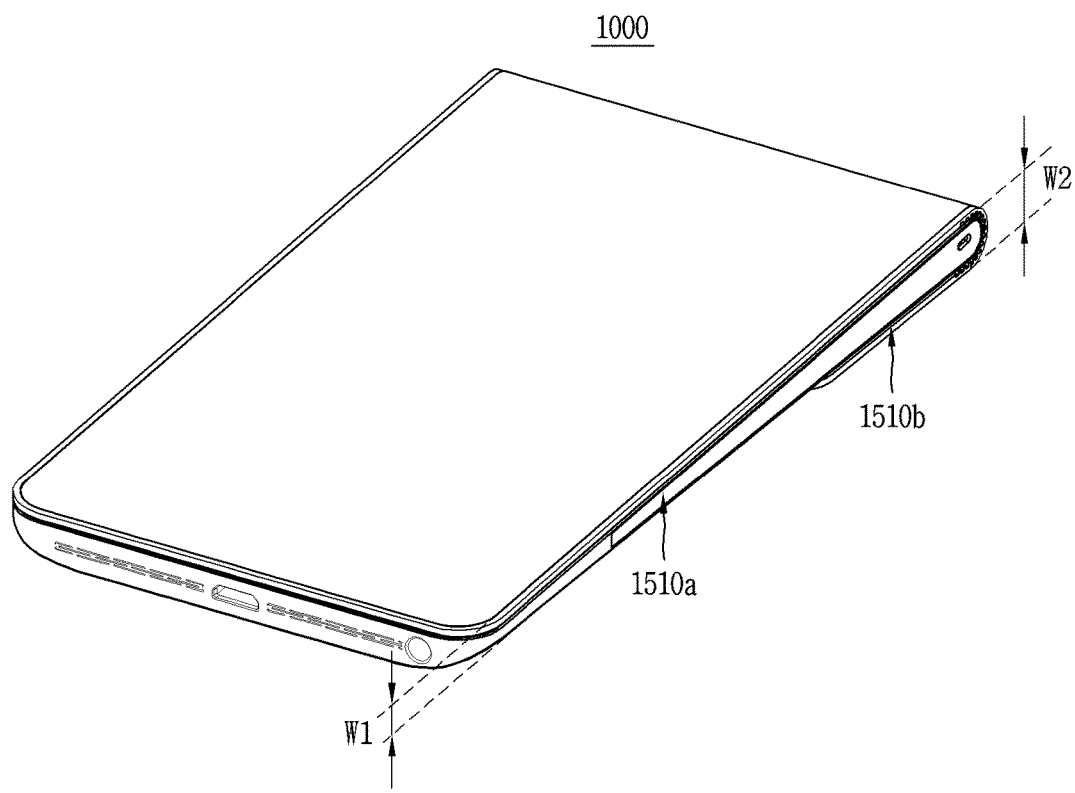
FIGS. 9A to 9C are conceptual views illustrating a mobile terminal according to still another embodiment of the present invention.
Figure 9B:
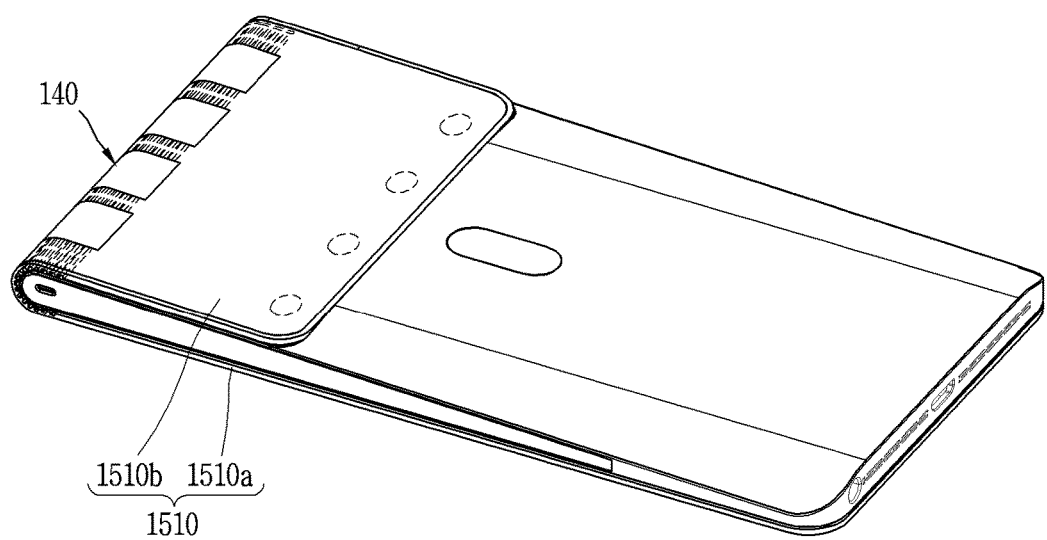
Figure 9C:
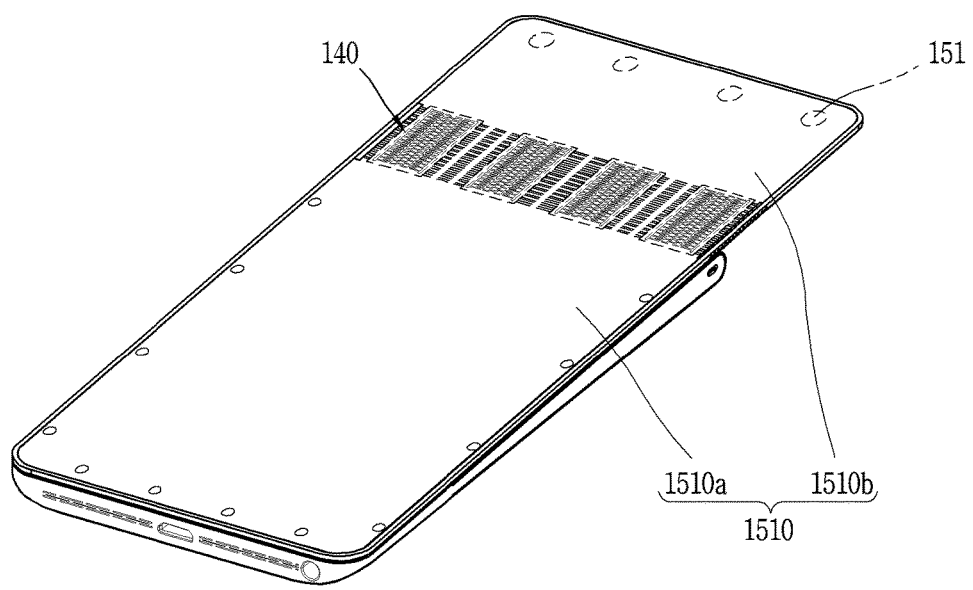

FIGS. 9A to 9C are conceptual views illustrating a mobile terminal according to still another embodiment of the present invention. FIGS. 9A and 9B are conceptual views illustrating a folded state, and FIG. 9C is a conceptual view illustrating an unfolded state. According to this embodiment, one area of the display unit 1510 fixed to the body portion in the unfolded state is defined as a first area 1510a, and the other area formed to surround the side and the rear surface of the body portion in the folded state is defined as a second area 1510b.

Referring to FIG. 9A, one end of the body portion has a first thickness W1, and the other end of the body portion, which is adjacent to the area surrounded by the second area 1510b of the display unit 1510 in the folded state, has a second thickness W2 thicker than the first thickness W1. The second thickness W2 is determined by a curvature of the display unit 1510.

The mobile terminal 1000 according to this embodiment includes a folding unit for controlling the display unit. The folding unit according to this embodiment may be implemented substantially the same as the first folding unit 130 shown in FIGS. 4A and 4B.

The display unit 1510 according to this embodiment includes a first magnet unit 151, and a second magnet (not shown) having a polarity opposite to that of the first magnet unit 151 may be arranged at one area of the rear cover 1030 corresponding to the first magnet 151 in the folded state.

According to this embodiment, one area of the display unit not the body portion of the mobile terminal may be deformed to implement the folded state and the unfolded state.

Figure 10A:
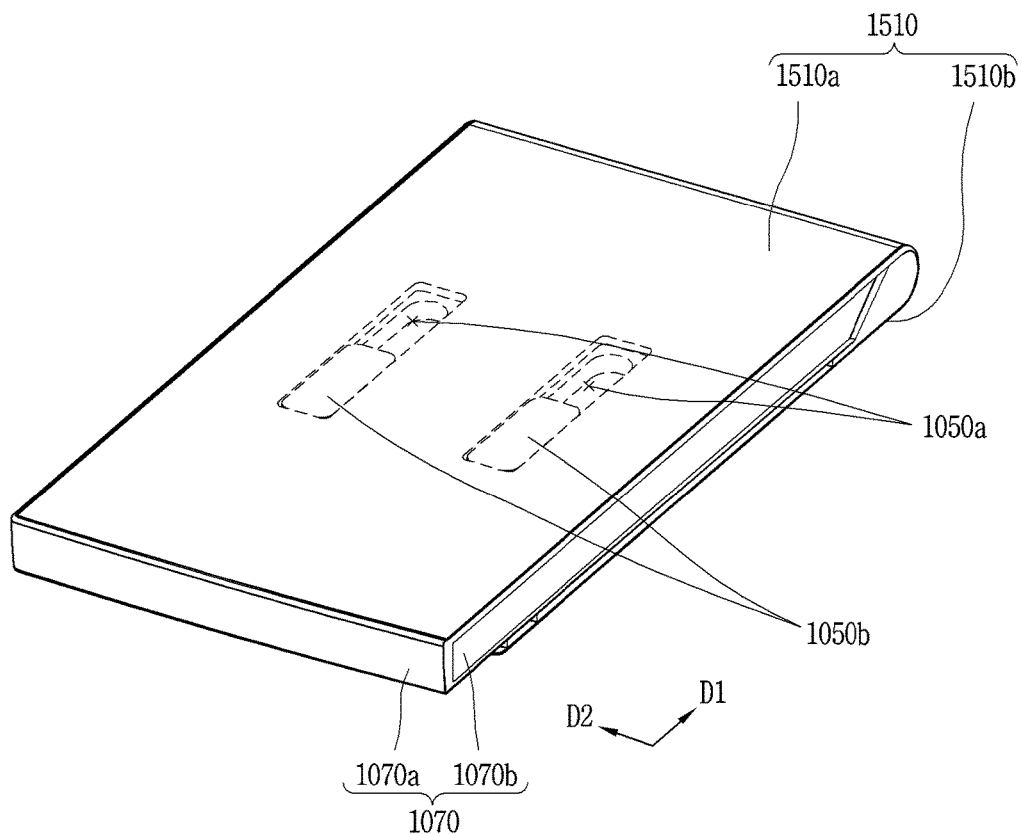
FIGS. 10A and 10B are conceptual views illustrating a mobile terminal according to further still another embodiment of the present invention.
Figure 10B:
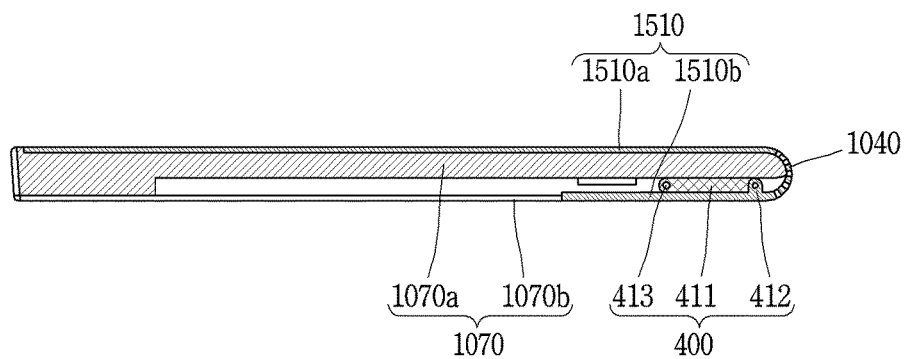

FIGS. 10A and 10B are conceptual views illustrating a mobile terminal according to further still another embodiment of the present invention. The mobile terminal 1000 according to this embodiment includes a body portion 1070 that includes a main body 1070a and a sliding body 1070b fixed to the main body 1070a slidably along the first direction D1.

A sliding groove 1050a extended along the first direction D1 is formed below the display unit 1510, and a sliding protrusion 1050b inserted into the sliding groove 1050a and movably formed by the external force is arranged. The sliding groove 1050b interacts with the sliding body 1070b.

Figure 10C:
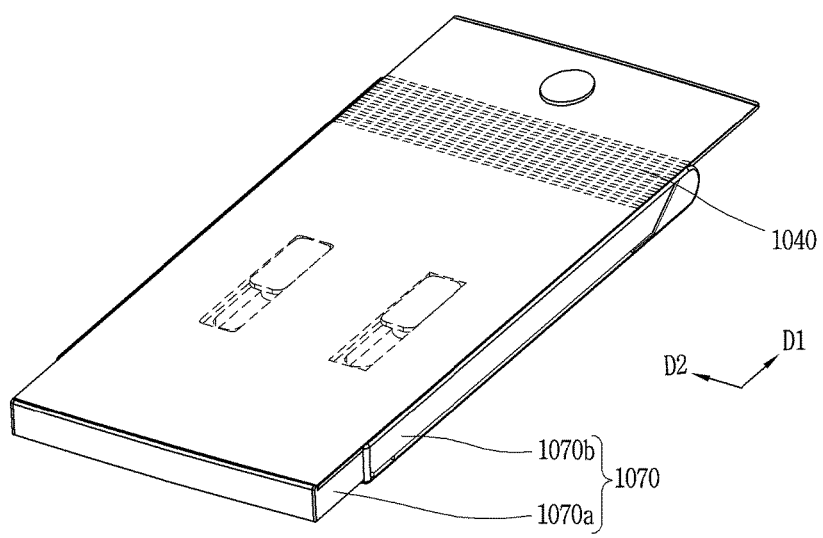
Figure 10D:
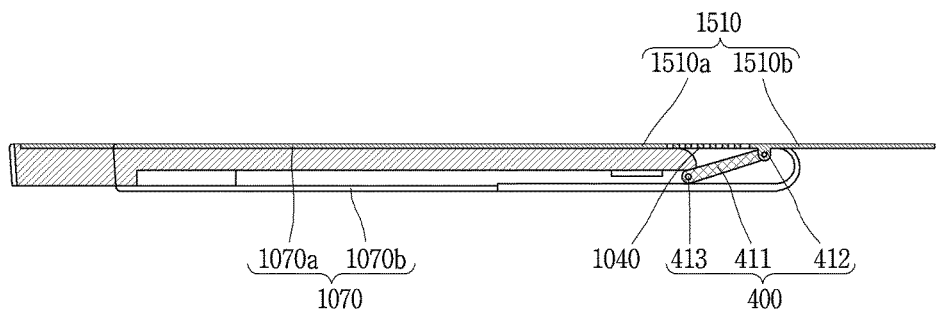

Referring to FIGS. 10A and 10C, the sliding body 1070b is formed to cover one area of the main body 1070a, and is slidably moved along the first direction D1. In the folded state, the second area 1510b of the display unit 1510 is formed to cover a rear surface of the sliding body 1070b. If the sliding body 1070b is moved along the first direction D1 in the folded state, the second area 1510b of the display unit 1510 arranged on the sliding body 1070b is unfolded.

Hereinafter, a structure of a fourth folding unit 400, which varies the state of the display unit 1510, will be described in detail. The display unit 1510 includes a deformation area 1040 that forms a plane in an unfolded state and makes a curved surface in a folded state. The fourth folding unit 400 includes a first link unit 411 having one end 413 connected to the sliding body 1070b and the other end 412 connected to the display unit 1510. If the sliding body 1070b is moved along the first direction D1, the first link unit 411 received in the sliding body 1070b is moved slantly along the main body 1070a and exposed to the outside of the sliding body 1070b.

The display unit 1510 is also moved by movement of the first link unit 411, and is unfolded by an angle of the first link unit 411 based on the main body 1070a.

Figure 11:
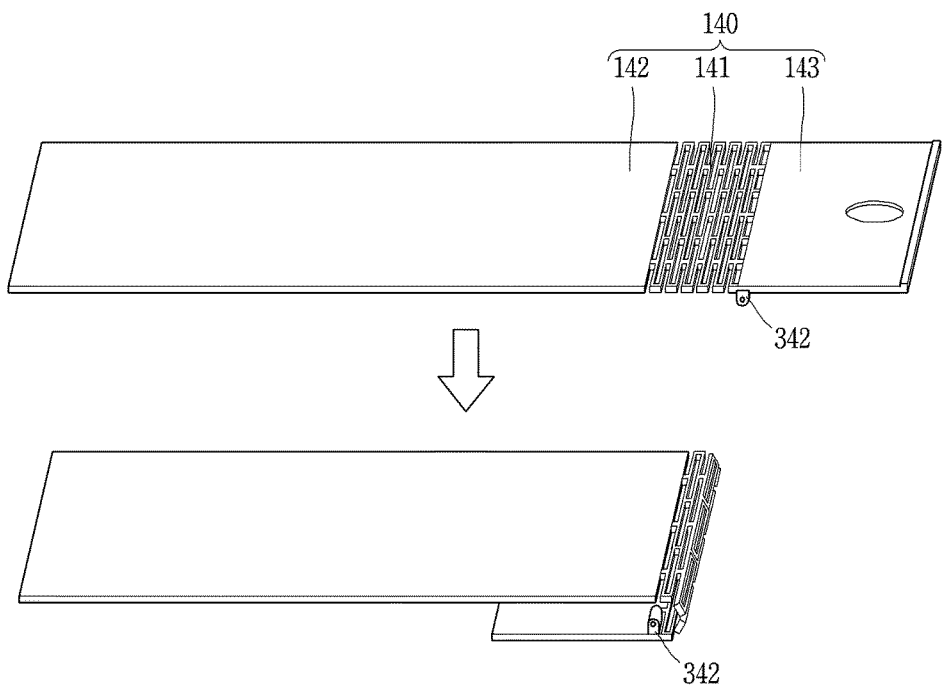
FIG. 11 is a conceptual view illustrating a deformation support unit supporting a display unit included in a mobile terminal according to the embodiment of FIG. 10A.

FIG. 11 is a conceptual view illustrating a deformation support unit supporting a display unit included in a mobile terminal according to the embodiment of FIG. 10A. The deformation support unit 140 includes a first support unit 142 corresponding to the first area 1510a of the display unit 1510, and a second support unit 143 corresponding to the second area 1510b of the display unit 1510. A first living hinge unit 141 is formed between the first and second support units 142 and 143. Also, a connecting ring unit 342 connected the other end of the first link unit 411 is formed between the first living hinge unit 141 and the second support unit 143. If the first link unit 411 connected with the connecting ring unit 342 is moved to the inside of the sliding body 1070b, the second area 1510b of the display unit 1510 supported by the second support unit 143 is folded to surround the sliding body 1070b.

According to this embodiment, the user may fold or unfold the display unit by moving the sliding body which is externally exposed.

Figure 12A:
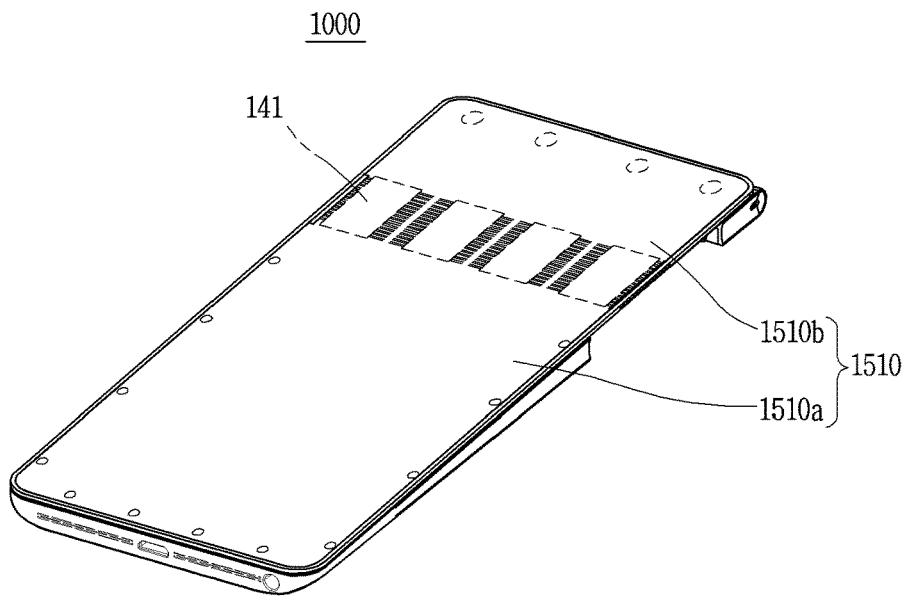
FIGS. 12A to 12C are conceptual views illustrating a mobile terminal according to further still another embodiment of the present invention.
Figure 12B:
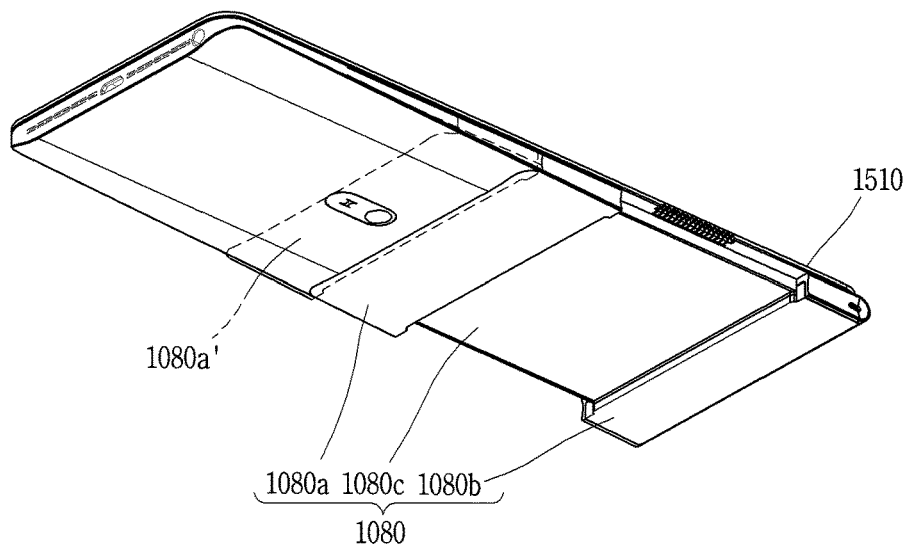
Figure 12C:
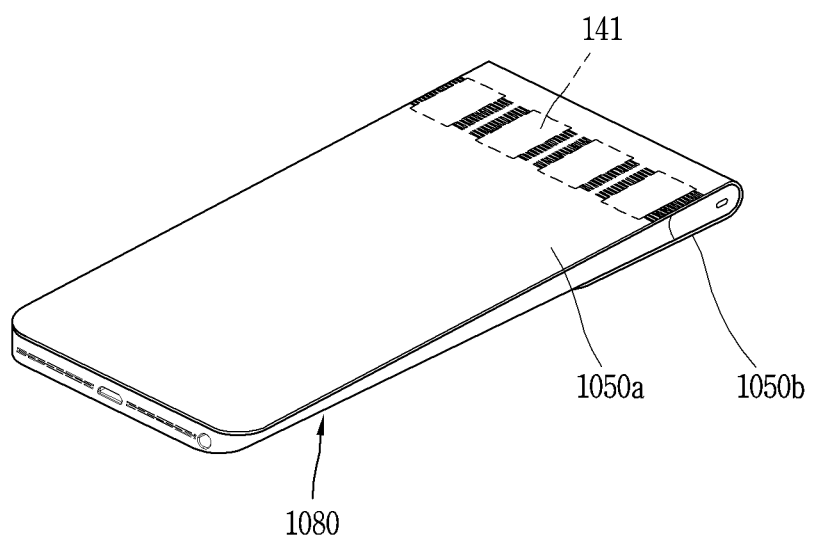

FIGS. 12A to 12C are conceptual views illustrating a mobile terminal according to further still another embodiment of the present invention. A body portion of the mobile terminal 1000 according to this embodiment includes a first body 1080a, a second body 1080b, and a third body 1080c connected to the second body 1080b and formed to slidably move to the inside of the first body 1080*a*. The first body 1080*a* includes a receiving space 1080*a*' formed to receive the third body 1080*c* therein. As shown in FIGS. 12A and 12B, the third body 1080*c* is exposed from the receiving space 1080*a* in an unfolded state of the display unit 1510, and the third body 1080*c* is received in the receiving space 1080*a*' in the folded state, whereby the first and second bodies 1080*a* and 1080*c* adjoin each other. The second and third bodies 1080*b* and 1080*c* are formed such that their one surfaces supporting the display unit 1510 constitute planes. The first body 1080*b* supports the first area 1510*a* of the display unit 1510.

In the unfolded state, the second area 1510*b* of the display unit 1510 is supported by the second and third bodies 1080*b* and 1080*c*, and in the folded state, the second area 1510*b* of the display unit 1510 is formed to surround the side of the second body 1080*b*.

The mobile terminal 1000 according to this embodiment includes a deformation support unit 140 (see FIGS. 4A and 4B) that supports the display unit 1510 to enable deformation. Although not shown in detail, a guide protrusion extended along the first direction D1 may be formed below the deformation support unit 140, and a guide rail corresponding to the guide protrusion may be formed at one area of the first to third bodies 1080*a*, 1080*b* and 1080*c*. The display unit 1510 may be deformed by movement of the first to third bodies 1080*a*, 1080*b* and 1080*c*, or may be deformed by an external force of the user. Hereinafter, a modified example of the display unit according to this embodiment will be described.

Figure 13A:
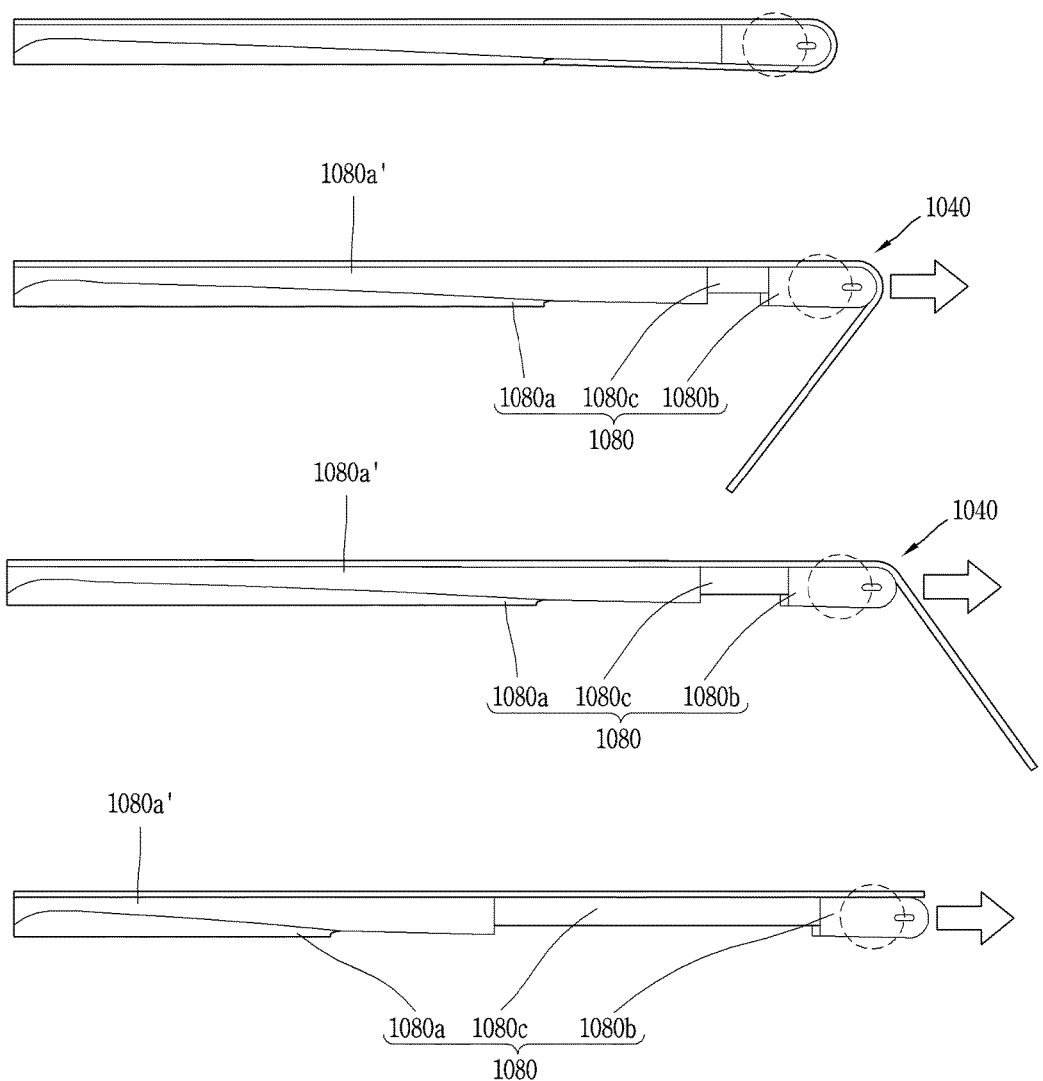
FIGS. 13A and 13B are conceptual views illustrating a driving state of a mobile terminal according to FIG. 12A.
Figure 13B:
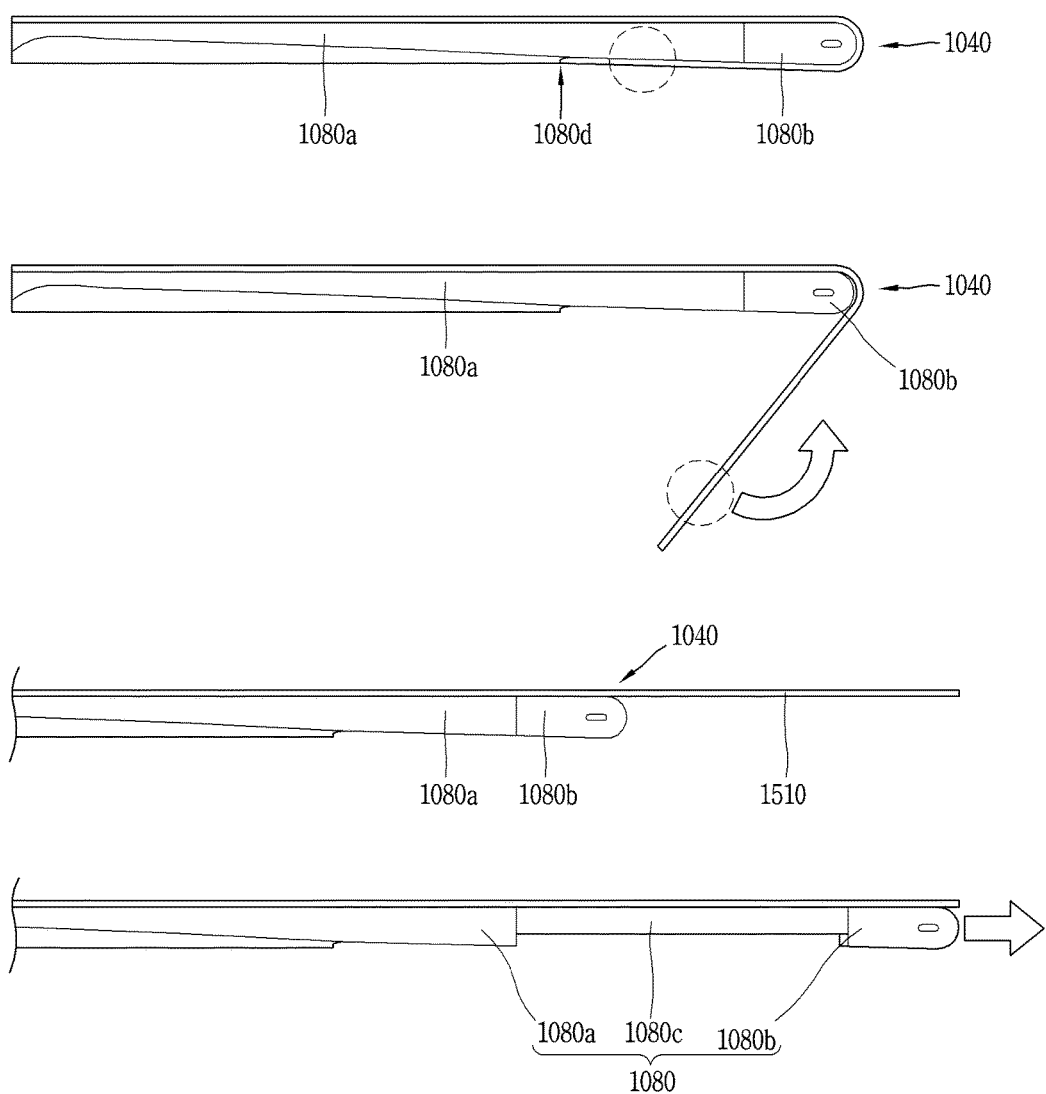

FIGS. 13A and 13B are conceptual views illustrating a driving state of a mobile terminal according to FIG. 12A.

FIG. 13A illustrates a state that the display unit 1510 is deformed in accordance with movement of the second body portion 1080*b*. The second body portion 1080*b* is gradually spaced apart from the first body portion 1080*a* by the external force applied by the user, and the third body 1080*c* is exposed from the receiving space 1080*a*'.

As the second body 1080*b* is moved, the deformation area 1040 of the display unit 1510 is gradually unfolded, and the display unit 1510 is supported by the third body 1080*c* which is exposed.

FIG. 13B illustrates that the display unit 1510 is first switched to the unfolded state regardless of the second body 1080*b*. In the folded state, a groove 1080*d* is formed between one end of the display unit 1510 and an external surface of the first body 1080*a*. The user may move the display unit 1510 by using the groove 1080*d* through a nail, etc.

If the deformation area 1040 becomes the unfolded state which is flat, the user may support the display unit 1510 by moving the second body 1080*b*.

Figure 14A:
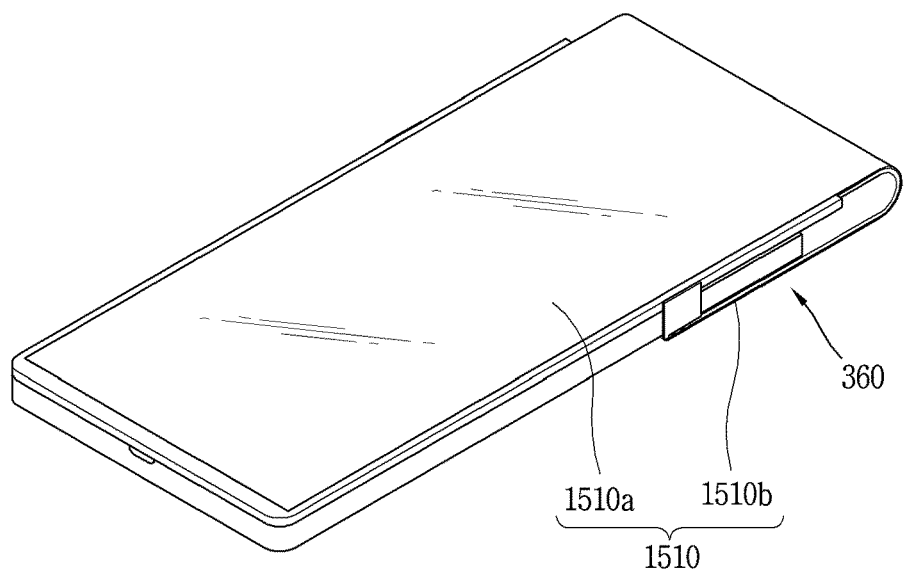
FIGS. 14A and 14B are views illustrating a mobile terminal of a folded state viewed from different directions, wherein the mobile terminal includes a fifth folding unit.
Figure 14B:
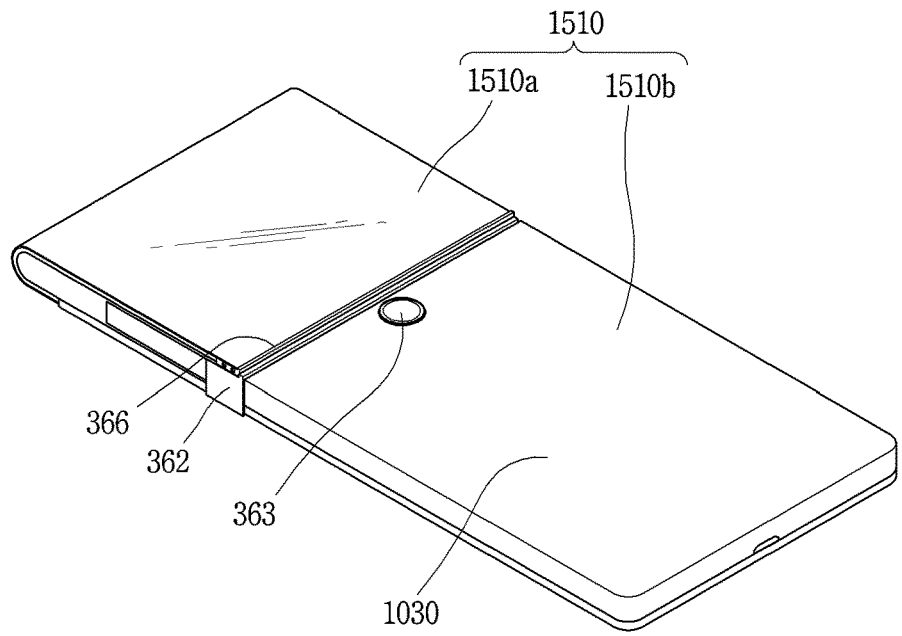

FIGS. 14A and 14B are views illustrating a mobile terminal of a folded state viewed from different directions, wherein the mobile terminal includes a fifth folding unit 360. For convenience of description, FIG. 14A is defined as a perspective view of the mobile terminal 1000 viewed from a front surface, and FIG. 14B is defined as a perspective view of the mobile terminal 1000 viewed from a rear surface.

The display unit 1510 may define its one area fixed to the front surface of the mobile terminal 1000 as the first area 1510*a* and define the other area extended from the first area 1510*a* and arranged on the rear surface of the mobile terminal 1000 as the second area 1510*b*.

The fifth folding unit 360 includes a button unit 363, a slide cover unit 362, and a locking portion 366. The locking portion 366 is unlocked and switched to the unfolded state on the basis of a pressure applied to the button unit 363. The slide cover unit 362 is slidably moved in one direction and supports the display unit 1510 to maintain the unfolded state of the display unit 1510. Hereinafter, a detailed structure of the fifth folding unit 360 will be described.

Figure 15A:
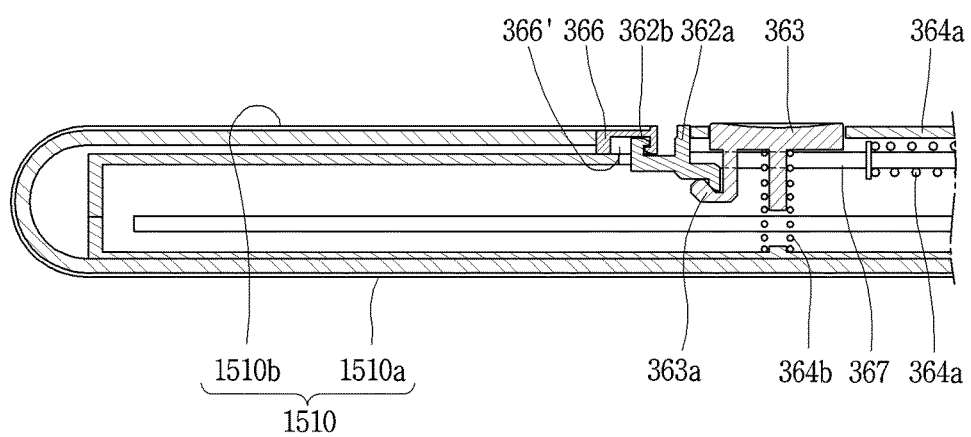
FIG. 15A is a partially cross-sectional view illustrating a mobile terminal of a folded state of FIGS. 14A and 14B.
Figure 15B:
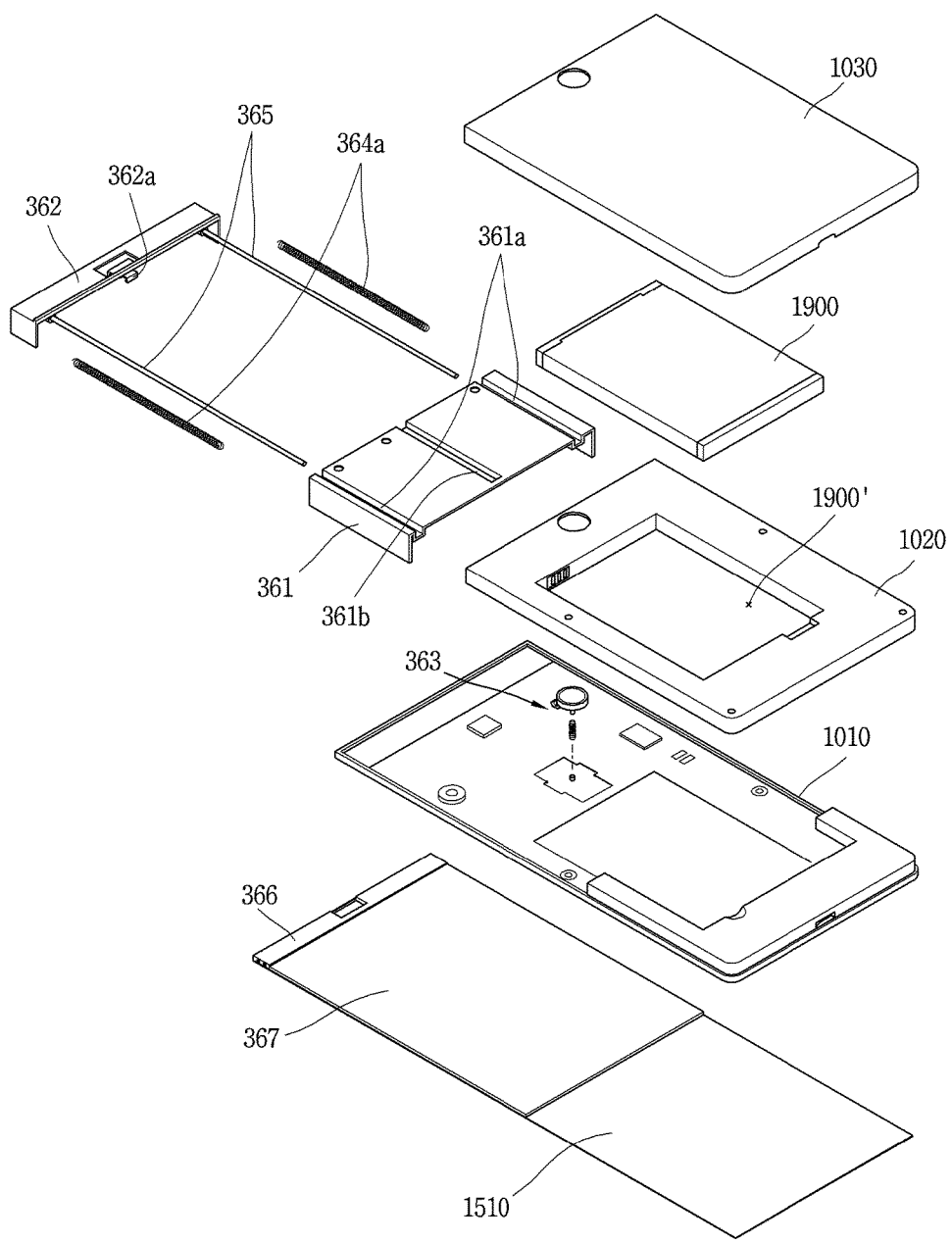
FIG. 15B is an exploded view illustrating a mobile terminal that includes a fifth folding unit.

FIG. 15A is a partially cross-sectional view illustrating a mobile terminal of a folded state, and FIG. 15B is an exploded view illustrating a mobile terminal that includes a fifth folding unit. Referring to FIG. 15B, a rear case 1020 includes a receiving space 1900' formed to receive the power supply unit 1900 therein, and the rear cover 1030 is formed to be detachably fixed to the rear case 1020. The rear case 1020 is formed to superimpose one area of the front case 1010.

The fifth folding unit 360 includes a guide unit 361, a slide cover unit 362 formed to slidably move from the guide unit 361, a locking portion 366 provided at the end of the display unit 1510 and fixed to the slide cover unit 362 in the folded state, a button unit 363 for detaching the locking portion 366 from the slide cover unit 362 by means of a pressure, and a support unit 367 made of an elastic material to elastically support the second area 1510*b* of the display unit 1510. The support unit 367 has a predetermined thickness.

The locking portion 366 is formed at the end of the support unit 367, and includes a locking groove 366' recessed from a surface facing the rear surface of the mobile terminal 1000 in the folded state. The locking portion 366 is extended along a width direction of the display unit 1510.

The guide unit 361 is arranged at the other area of the front case 1010, where the rear case 1020 is not formed. The guide unit 361 and the slide cover unit 362 are connected to each other by slide poles 365 extended along one direction. In this case, the one direction is substantially the same as the extended direction of the mobile terminal 1000. The guide unit 361 includes an open area formed to pass through the button unit 363. The guide unit 361 is covered by the rear cover 1030 together with the rear case 1020.

The guide unit 361 includes a first guide rail 361*a* in which the slide poles 365 are slidably received, and a second guide rail 361*b* guiding a fixed protrusion 362*a* of the slide cover unit 362 to move along the one direction. Therefore, the slide cover unit 361 is supported by the slide poles 365 while sliding from one end of the guide unit 361 to pass through the other end, whereby the slide cover unit 361 is moved to be spaced apart from the guide unit 361.

The slide cover unit 362 is configured to be extended to a width direction of the display unit 1510 and to partially surround the sides of the display unit 1510 and the support unit 367. The slide cover unit 362 is formed to be superimposed with the locking portion 362. In the folded state, the locking portion 362 is arranged to cover one area of the slide cover unit 362.

In the folded state, the locking portion 366 is fixed by a second bending portion 362*b* of the slide cover unit 362, and a first bending portion 362*a* of the slide cover unit 361 is caught in a hanging portion 363*a* of the button unit 363 and thus its movement is restricted.

Referring to FIG. 15A, the fifth folding unit 360 includes a first elastic member 364*a* extended to the one direction to elastically support the slide cover unit 362 and a second elastic member 364*b* configured to elastically support the button unit 363 from the inside of the mobile terminal 1000.

One area of the button unit 363 is exposed to the outside by an opening area of the rear cover 1030. The user may detach the slide cover unit 362 and the locking portion 366 from the button unit 363 by pressurizing the button unit 363.

The hanging portion 363a of the button unit 363 has a shape extended in an inner direction of the mobile terminal 1000 and then bent in an opposite direction of the inner direction.

The first and second bending portions 362a and 362b are superimposed on each other along the length direction of the mobile terminal 1000, and may be arranged at a center area of the slide cover unit 362.

The first bending portion 362a and the second bending portion 362b of the slide cover unit 362 have shapes bent in directions opposite to each other. For example, the first bending portion 362a is bent in the inner direction of the mobile terminal 1000, thereby being fitted into the hanging portion 363a, and the second bending portion 362b is bent toward the outside from the inner direction of the mobile terminal 1000, thereby being fitted into the locking groove 366'. The first bending portion 362b is prevented from being detached from the hanging portion 363a by elastic forces of the first and second elastic members 364a and 364b.

Hereinafter, the structure that the locking portion 366 and the slide cover unit 362 are detached from the button unit 363 by the pressure applied to the button unit 363 will be described.

Figure 16:
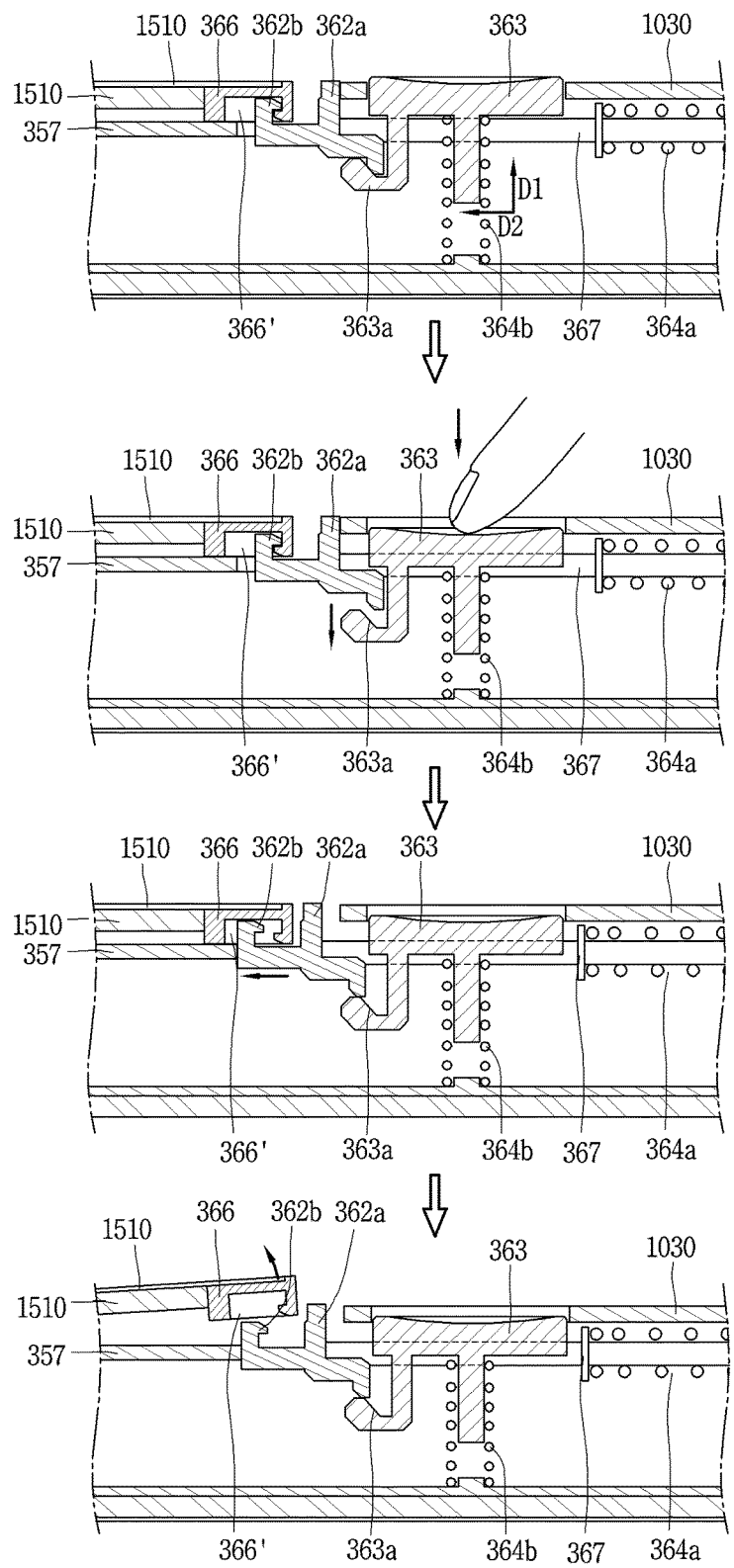
FIG. 16 is a conceptual view illustrating a structure that a locking portion and a slide cover unit are detached from a button unit by a pressure applied to the button unit.

FIG. 16 is a conceptual view illustrating a structure that a locking portion and a slide cover unit are detached from a button unit by a pressure applied to the button unit. The first elastic member 364a provides the elastic force to the slide cover unit 362 in a first direction D1, and the second elastic member 364b provides the elastic force to the button unit 363 in a second direction D2 crossing the first direction D1.

The first bending portion 362a is caught in the hanging portion 363a by the elastic force of the second elastic member 364b, and the second bending portion 362b is caught in the locking groove 366', whereby its movement is restricted. A hanging protrusion 362b is formed at one area of the locking portion 366 constituting the locking groove 366', and the second bending portion 362b is caught in the hanging protrusion 362b. Also, the locking groove 366' is formed to have a predetermined width to move the second bending portion 362b.

If an external force of an opposite direction of the second direction D2 is applied to the button unit 363, the button unit 363 is moved to the opposite direction. In this case, the opposite direction corresponds to a moving direction toward the inside of the mobile terminal 1000.

As the hanging portion 363a of the button unit 363 is moved to the opposite direction, the hanging portion 363a is detached from the first bending portion 362a. The slide cover unit 362 is moved to the second direction D2 by the first elastic member 364a.

Surfaces where the first bending portion 362a and the hanging portion 363a face each other may be formed of oblique surfaces. Therefore, the slide cover unit 362 may gradually be moved along the second direction D2. The second bending portion 362b of the slide cover unit 362 is also moved along the second direction D2 inside the locking groove 366'. Therefore, the second bending portion 362b is detached from the hanging protrusion 362b.

As a result, the locking portion 366 may be detached from the slide cover unit 362.

Although not shown in detail, the first bending portion 362a may be arranged to be again caught in the hanging portion 363a by the external force. Alternatively, the first bending portion 362a may be detached from the hanging portion 363a on the basis of slide movement of the slide cover unit 362, and then may be arranged in parallel with the hanging portion 363a.

Figure 17A:
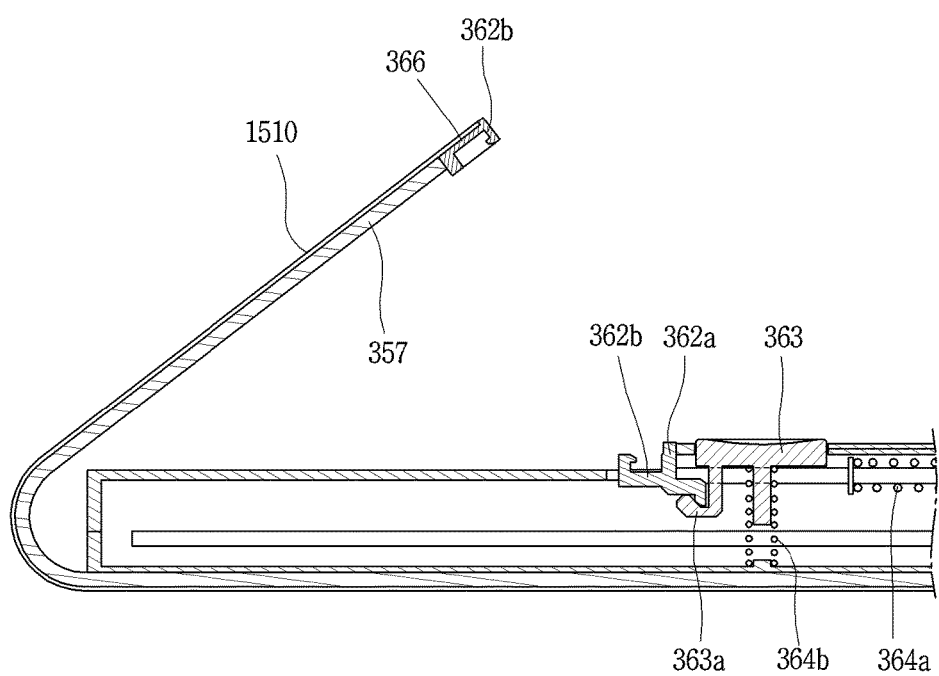
FIG. 17A is a partially cross-sectional view illustrating a state that the locking portion is detached from the slide cover unit.
Figure 17B:
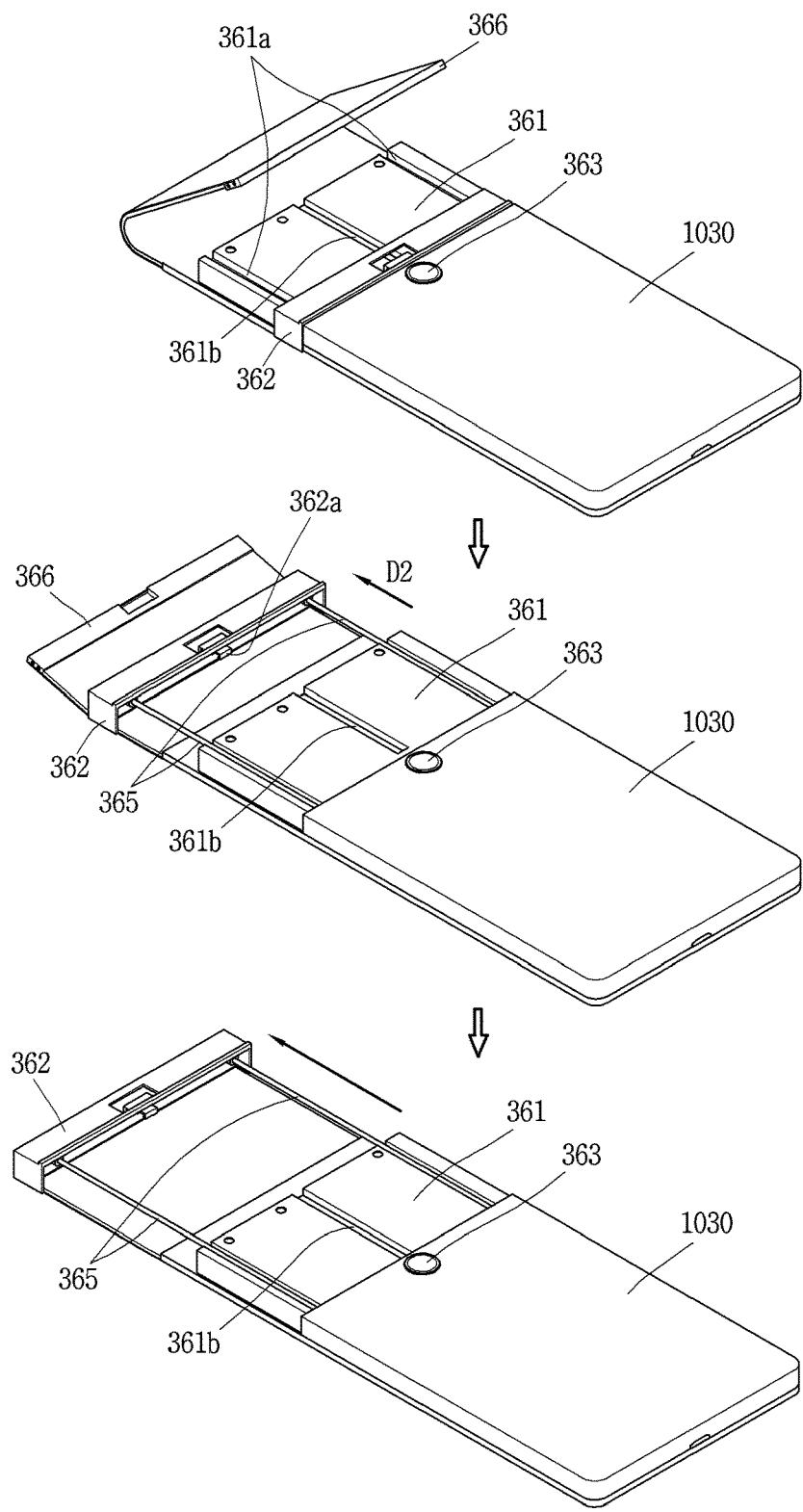
FIG. 17B is a conceptual view illustrating a structure that a mobile terminal is switched to an unfolded state by movement of a slide cover.

FIG. 17A is a partially cross-sectional view illustrating a state that the locking portion 366 is detached from the slide cover unit 362, and FIG. 17B is a conceptual view illustrating a structure that a mobile terminal is switched to an unfolded state by movement of a slide cover.

The side cover unit 362 may be arranged to adjoin the rear cover 363, and the first bending portion 362a may be caught in the hanging portion 363a. In this case, the display unit 1510 equipped with the locking portion 366 is not fixed, and maintains a deformable state that may be deformed by means of the external force.

If the display unit 1510 is detached from the slide cover unit 362, one area of the guide unit 361 is exposed. The slide poles 365, each of which one end is connected to the slide cover unit 362, are received in the inside of the mobile terminal 1000, which is covered by the rear cover 1030.

The slide cover unit 362 is detached from the button unit 363 by the external force applied to the second direction D2 and then moved along the second direction D2. The slide poles 365 are moved along the first guide rail 361a on the basis of movement of the slide cover unit 362 and gradually exposed. While the slide cover unit 362 is being moved along the second direction D2, the first and second bending portions 362a and 362b are moved along the second guide rail 361b. That is, it is preferable that the second guide rail 361b is formed to be greater than widths of the first and second bending portions 362a and 362b.

The slide cover unit 362 may be slid stably by the first and second guide rails 361a and 361b, and damage of the first and second bending portions 362a and 362b may be minimized by the first and second guide rails 361a and 361b.

Although not shown in detail, a sliding fixed portion may further be formed so as not to detach the display unit 1510 and the side of the support unit 367 from each other while the slide cover unit 362 is being slid.

Alternatively, the slide cover unit 362 may further include a support area bent to support one area on the front surface of the display unit 1510.

If the slide cover unit 362 reaches the end of the display unit 1510, the slide cover unit 262 is fixed to the locking portion 366, whereby the unfolded state is achieved. In the unfolded state, the display unit 1510 is supported by the support unit 367 and the slide poles 365. Hereinafter, the structure that the slide cover unit 362 is fixed to the locking portion 366 in the unfolded state will be described.

Figure 18A:
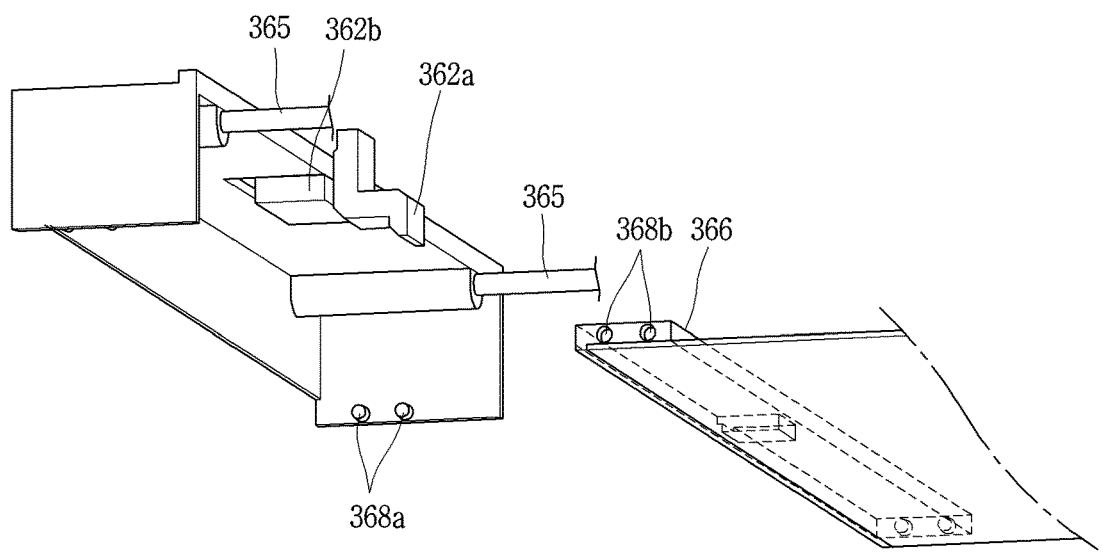
FIG. 18A is a conceptual view illustrating a fitting protrusion and a fitting groove.
Figure 18B:
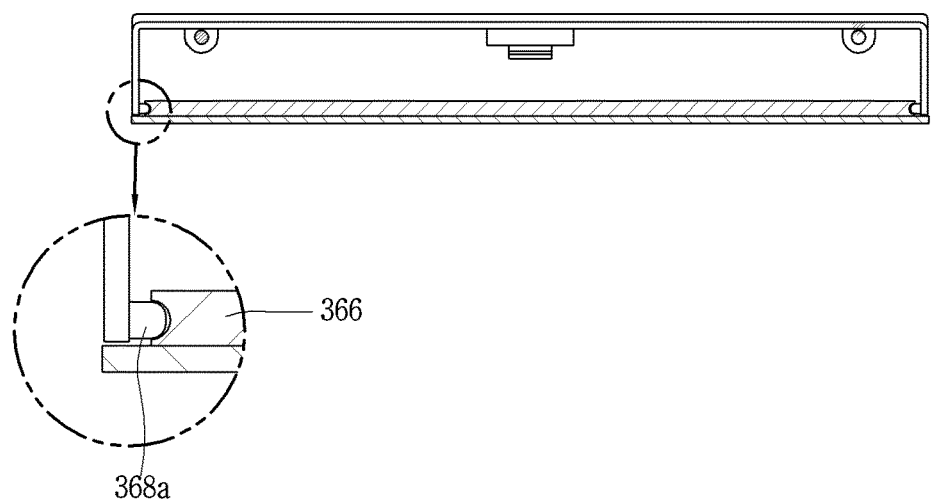
FIG. 18B is a partially cross-sectional view illustrating a state that the fitting protrusion is fitted into the fitting groove.

FIG. 18A is a conceptual view illustrating a fitting protrusion and a fitting groove, and FIG. 18B is a partially cross-sectional view illustrating a state that the fitting protrusion is fitted into the fitting groove.

Referring to FIGS. 18A and 18B, the slide cover unit 362 includes at least one fitting protrusion 368a protruded to one area surrounding the side of the display unit 1510. The locking portion 366 includes at least one fitting groove 368b which is recessed from the side and corresponds to the fitting protrusion 368a.

If the fitting groove 368b is fitted into the fitting protrusion 368a as the slide cover unit 362 is slid, the slide cover unit 362 and the locking portion 366 may be prevented from being detached from each other, whereby the unfolded state may be achieved stably. If the external force is applied to the slide cover unit 362, the fitting groove 368b and the fitting protrusion 368a may be detached from each other.

According to this embodiment, the display unit may stably be received in the body portion of the mobile terminal in the folded state by means of the bending portion formed to be caught in the locking portion and the button unit, and the user may switch the display unit to the unfolded state more easily by applying the external force to the button unit which is elastically supported.

Also, the end of the display unit is supported by the slide cover unit, whereby the unfolded state may be achieved more stably.

Figure 19A:
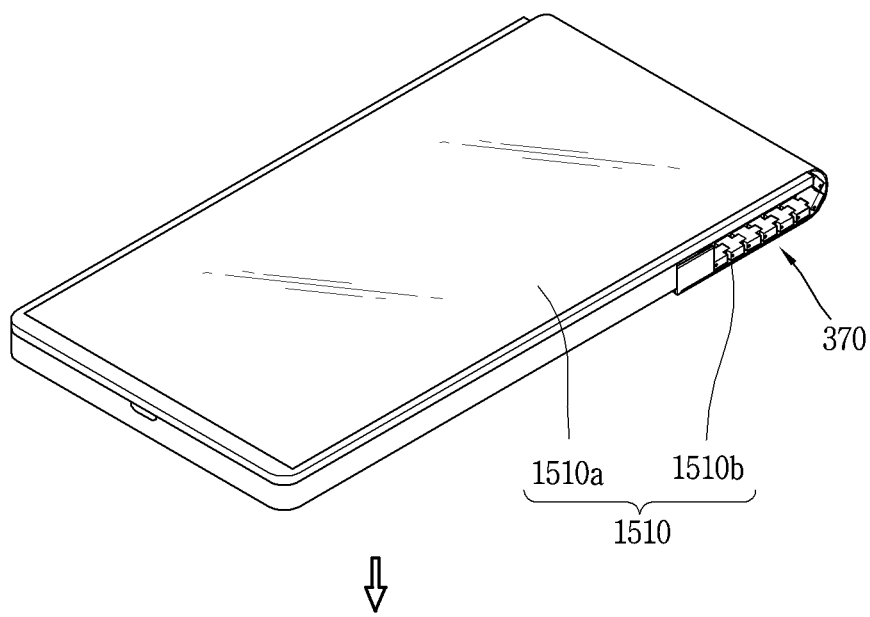
FIG. 19A is a view illustrating a mobile terminal provided with a display unit, which is folded in accordance with another embodiment, and viewed in one direction.
Figure 19A:
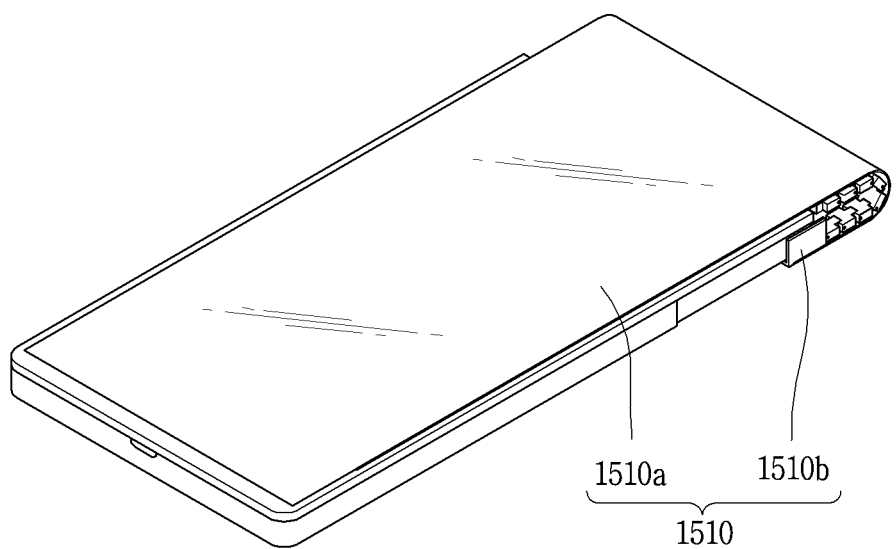
Figure 19B:
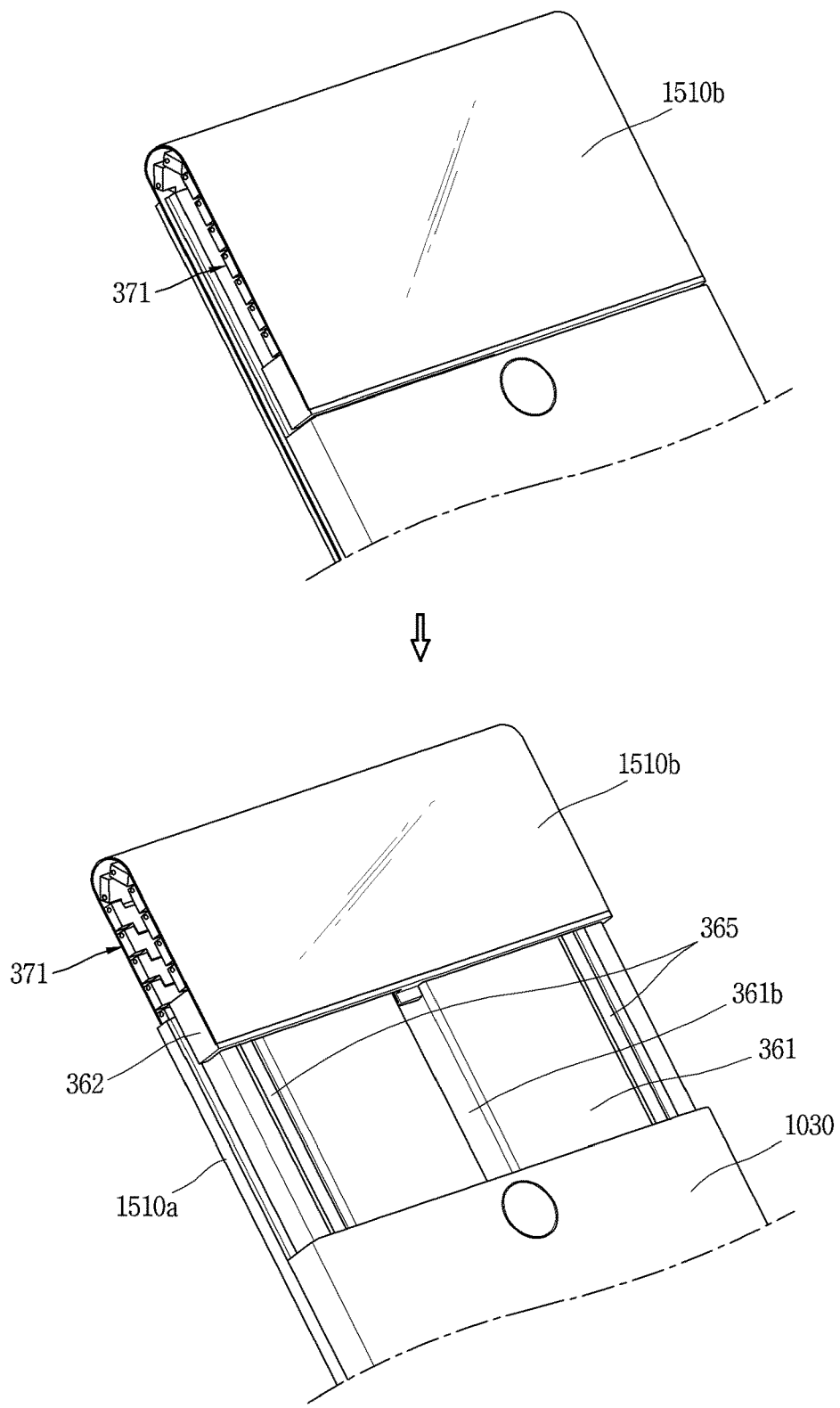
FIG. 19b is a view illustrating the mobile terminal of FIG. 19A viewed in another direction.
Figure 20:
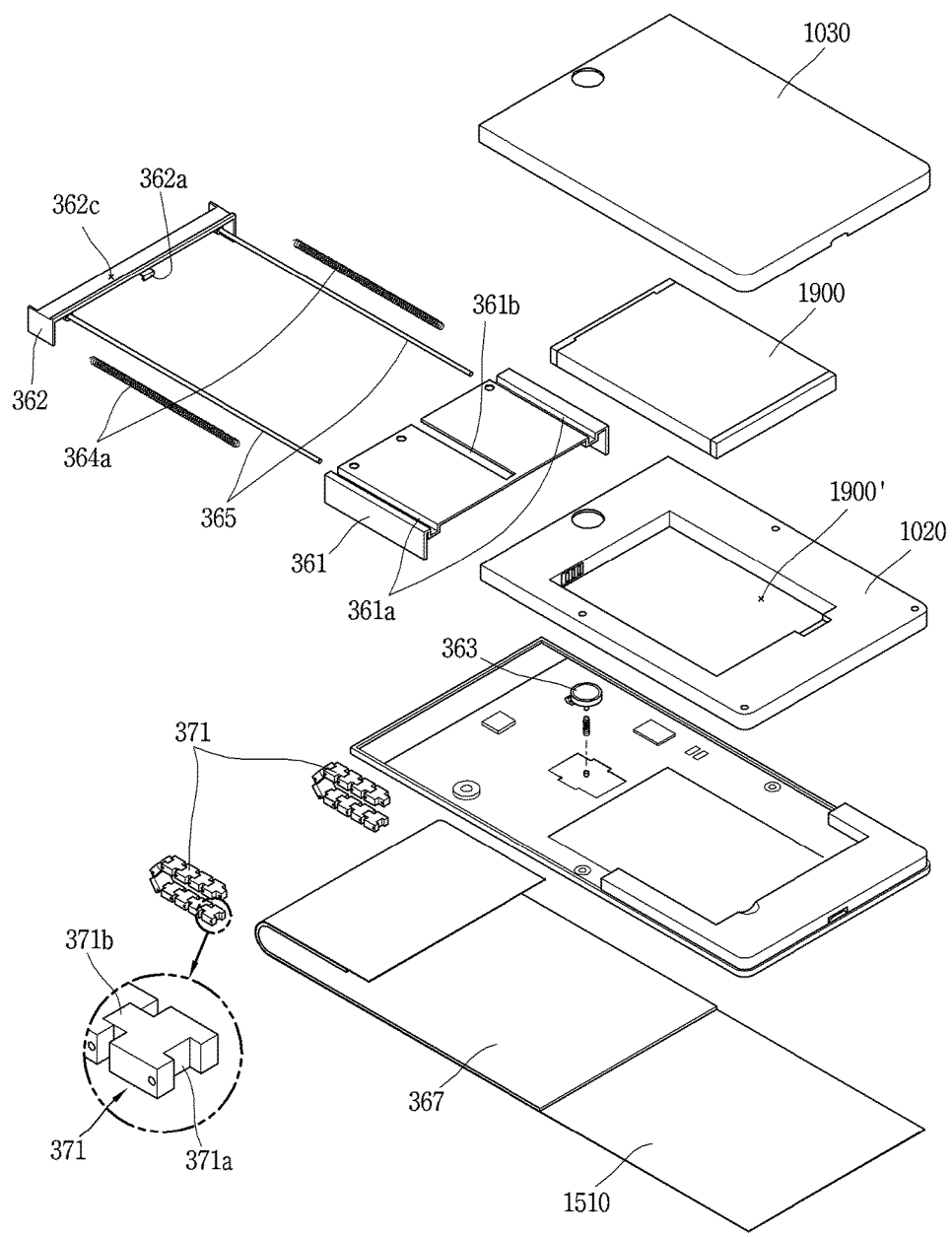
FIG. 20 is an exploded view illustrating a mobile terminal according to the embodiment of the present invention.

FIG. 19A is a view illustrating a mobile terminal provided with a display unit, which is folded in accordance with another embodiment, and viewed in one direction, and FIG. 19B is a view illustrating the mobile terminal of FIG. 19A viewed in another direction. FIG. 20 is an exploded view illustrating a mobile terminal according to the embodiment of the present invention.

The mobile terminal 1000 according to this embodiment includes a sixth folding unit 370 for folding of the display unit. The mobile terminal 1000 according to this embodiment includes a first area 1510a fixed to the front surface of the body portion of the mobile terminal 1000, and a second area 1510b extended from the first area 1510a and formed to be moved to the front surface or the rear surface in a state that one end is fixed to the rear surface of the body portion of the mobile terminal 1000.

Referring to FIGS. 19A and 19B, in a state that one area of the display unit 1510 is fixed to the rear surface of the mobile terminal 1000, the display unit 1510 is extended or downsized. An area where the display unit 1510 constitutes a curvature radius is formed on the second area 1510b.

The sixth folding unit 370 includes a second link unit 371 arranged at one area of the rear surface of the display unit 1510. Hereinafter, elements of the sixth folding unit 370 will be described with reference to FIG. 19B and FIG. 20.

The sixth folding unit 370 includes a guide unit 361, a slide cover unit 362 formed to be slid from the guide unit 361, a button unit 363 for being detached from the slide cover unit 362 by means of a pressure, a support unit 367 made of an elastic material with a predetermined thickness to elastically support the second area 1510b of the display unit 1510, a first elastic member 364a extended to the one direction to elastically support the side cover unit 362, and a second elastic member 364b made to elastically support the button unit 363 from the inside of the mobile terminal 1000. The elements of the sixth folding unit 370 except the second link unit 371 will be substantially the same as those of the fifth folding unit 360 of FIG. 15B. Therefore, the same reference numerals will be given to same or similar elements, and the redundant description will be omitted.

However, the sixth folding unit 370 according to this embodiment does not include the locking unit 366 of the fifth folding unit 360, and the slide cover unit 362 does not include the second bending portion 362b.

That is, one end of the display unit 1510 is fixed to the slide cover unit 362. The slide cover unit 362 includes a fixed area 362c of which one surface is recessed to fix one end of the display unit 1510 thereto. In a state that the one end of the display unit 1510 is fixed to the slide cover unit 362, the folding area, which forms a curvature by means of sliding movement of the slide cover unit 362, is varied.

Both sides of the display unit 1510 are supported by a pair of second link units 371. The link units are comprised of a plurality of link members connected to one another along the extended direction of the display unit 1510. Each link member includes a link groove 371a and a link protrusion 371b, which are formed at both ends which face each other. The link members are connected to one another to enable relative rotation with respect to the link grooves 371a and the link protrusions 371b. The link units extended to the one direction by connection of the link members may be formed such that their shape may be deformed by the external force.

Each of the link units is formed at a predetermined length, and has one end connected to the slide cover unit 362 and the other end formed to adjoin the body portion of the mobile terminal 1000. The second link units 371 may minimize damage of the display unit 1510 by supporting the deformation area of the display unit 1510, which forms a specific curvature radius.

One surface of each link unit 371 may be fixed to one area of the support unit 367, and may be attached thereto by an adhesive member. Although the sixth folding unit 370 includes a pair of second link units 371 in FIG. 20, the number of second link units 371 is not limited to the example of FIG. 20.

Referring to FIGS. 19A and 19B again, the side of the second link 371 may be exposed to the outside together with the sides of the display unit 1510 and the support unit 367. Hereinafter, a structure that the display unit 1510 is folded by the button unit 363, the slide cover unit 362 and the second link units 371 will be described.

Figure 21:
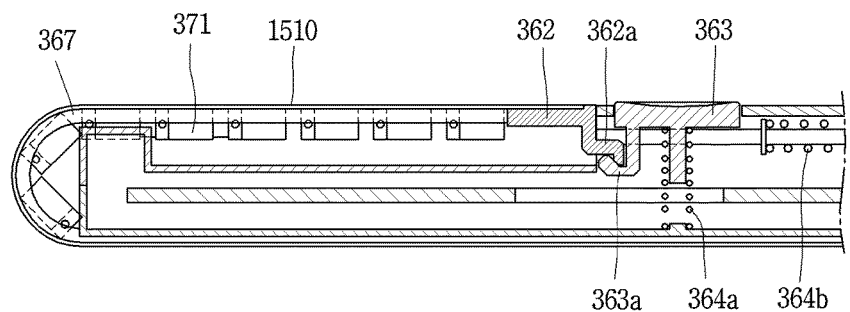
FIG. 21 is a conceptual view illustrating a structure that the display unit is folded.
Figure 21:
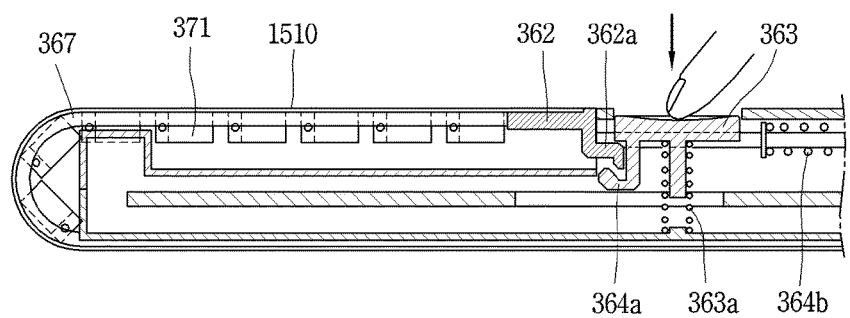
Figure 21:
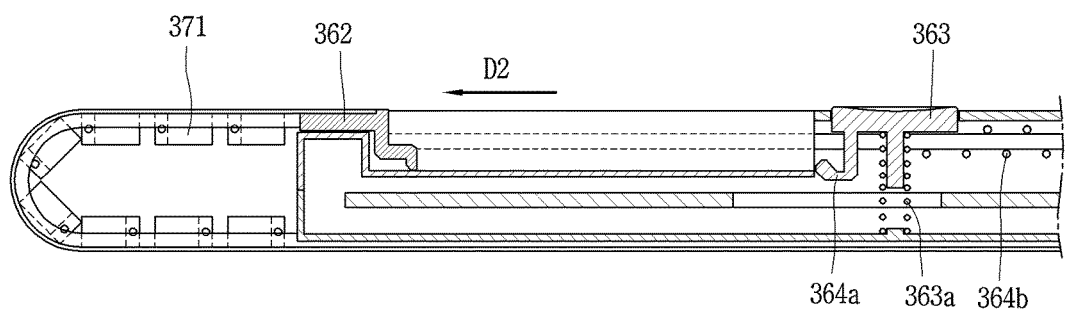

FIG. 21 is a conceptual view illustrating a structure that the display unit is folded.

The first bending portion 362a is fixed to the hanging portion 363a of the button unit 363 by the first elastic member 364a. The button unit 363 is moved by the external force applied thereto, and hanging of the first bending portion 362a is released from the hanging portion 363a.

If hanging of the first bending portion 362a is released, the slide cover unit 362 is moved to the second direction D2 by the elastic force of the second elastic member 364b that elastically supports the slide cover 362. If the slide cover unit 362 is moved to the second direction D2, the folding area is varied, and a part of the second area 1510b of the display unit 1510 is moved to the front surface of the mobile terminal 1000.

The slide cover unit 362 may be formed slidably on the body portion of the mobile terminal 1000. The body portion of the mobile terminal 1000 may further include a stopper for preventing the slide cover unit 362 from being detached from the body portion of the mobile terminal 1000.

Although not shown in detail, the slide cover unit 362 may again be fixed to the button unit 363 on the basis of the external force applied to the slide cover unit 362 in an opposite direction of the second direction D2.

According to this embodiment, damage of the display unit may be minimized by the link units while the display unit is being deformed. Also, the state of the display unit may be varied more easily by the external force applied to the button unit.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 1800 of the mobile terminal.

The invention claimed is:
1. A mobile terminal comprising:
a flexible display unit, which includes a deformation area deformable to a folded state and an unfolded state by an external force;

a body portion supporting one area of the flexible display unit on a front surface and including a first body and a second body detached from each other;
a deformation support unit supporting the display unit, having a first living hinge unit corresponding to the deformation area; and
a folding unit built in the body portion, guiding deformation of the display unit by the external force,
wherein the folding unit is formed between the first and second bodies, and includes a second living hinge unit arranged to correspond to the first living hinge unit,
wherein the folding unit includes:
a first connecting unit formed at one end of the second living hinge unit and fixed to the second body; and
a second connecting unit formed at the other end of the second living hinge unit, having a guide groove formed slidably in the first body along a first direction which is a length direction of the body portion, and
wherein the second body includes a guide protrusion inserted into the guide groove and the guide protrusion moves along the guide groove.

2. The mobile terminal according to claim 1, wherein one area of the second living hinge unit is exposed by the first and second bodies in the unfolded state, and if the unfolded state is switched to the folded state, the other area of the second living hinge unit is exposed to the first and second bodies by sliding of the second connecting unit.

3. The mobile terminal according to claim 1, wherein the second living hinge unit includes a plurality of ribs formed to be spaced apart from one another by the external force.

4. The mobile terminal according to claim 3, wherein the plurality of ribs are arranged to be closely attached to one another in the folded state, and each rib is provided with a fitting protrusion protruded from one side and a fitting groove recessed from the other side such that a fitting protrusion of another adjacent rib is fitted thereinto.

5. The mobile terminal according to claim 4, wherein an external surface of the ribs is formed to constitute one surface with external surfaces of the first and second bodies in the unfolded state.

6. The mobile terminal according to claim 4, wherein the folding unit further includes an elastic support member arranged below the living hinge unit and made to be elastically deformed by the external force.

7. The mobile terminal according to claim 1, wherein the first and second bodies include first and second magnet units, respectively, at corresponding areas in the folded state, the first and second magnet units having polarities opposite to each other.

8. The mobile terminal according to claim 1, wherein the folding unit includes:
a first frame slidably connected to the first body;
a second frame fixed to the second body; and
an elastic member connecting the first and second frames with each other, having a plurality of coil springs corresponding to the deformation area.

9. The mobile terminal according to claim 1, wherein the folding unit includes:
a button unit built to be pressed in the body portion;
a first bending portion coupled to one end of the display unit and formed to be caught in the button unit; and
a slide cover unit formed slidably if the button unit is pressed.

10. The mobile terminal according to claim 9, wherein the display unit includes a first area supported in the body portion on the basis of the deformation area and a second area detached from the body portion in the unfolded state.

11. The mobile terminal according to claim 9, wherein the display unit is partitioned into a first area arranged on the front surface and a second area deformed to a first state surrounding a part of the rear surface and a second state unfolded toward the front surface, and includes a link unit formed on an inner surface of the second area and formed to be deformed by an external force, the link unit being comprised of a plurality of link members flexibly connected to one another to correspond to a curvature radius of the display unit.

12. The mobile terminal according to claim 10, wherein the folding unit further includes a locking portion built in one end of the second area of the display unit and detachably fixed to the slide cover unit.

13. The mobile terminal according to claim 12, wherein the slide cover unit further includes a second bending portion bent in an opposite direction of the first bending portion and formed to be caught in the locking portion, and the locking portion includes a locking groove recessed to allow the second bending portion to be caught therein.

14. The mobile terminal according to claim 10, wherein the body portion includes a main body portion through which the first area is supported and a sliding body portion provided to slidably move from the main body portion.

15. The mobile terminal according to claim 14, wherein the slide cover unit is coupled to the locking unit by being slid to be spaced apart from the support unit if the slide cover unit is detached from the button unit.

16. The mobile terminal according to claim 15, wherein the slide cover unit further includes a fitting protrusion formed on one surface, and the locking portion further includes a fitting groove to allow the fitting protrusion to be fitted thereinto if the slide cover unit is detached from the button unit.

17. The mobile terminal according to claim 10, wherein the folding unit includes a link unit having one end connected to the sliding body portion and the other end connected to the display unit, linked with the sliding body portion, and the other end of the link is fixed between the deformation area and the second area.

18. The mobile terminal according to claim 9, wherein the folding unit further includes a first elastic member supporting the button unit, and one area of the button unit is exposed to the outside of the body portion, and the button unit includes a hanging portion formed to be fixed to the bending portion.

19. The mobile terminal according to claim 18, wherein the folding unit further includes a second elastic member formed to elastically support the slide cover unit to slidably move the slide cover unit.

20. The mobile terminal according to claim 19, wherein the folding unit further includes:
slide poles extended to a sliding direction of the slide cover unit; and
a guide unit that includes a first guide rail supporting the slide cover unit to slidably move the slide cover unit and receiving the slide poles therein and a second guide rail receiving the first bending portion therein.

21. The mobile terminal according to claim 1, wherein the display unit includes first and second areas identified from each other by the deformation area, and the body portion includes the first body supporting the first area of the display unit, the second body supporting the second area in the folded state, and a third body connected to the second body, received in the first body in the folded state and exposed in the unfolded to support the second area.

22. The mobile terminal according to claim 1, wherein the deformation support unit includes protrusion shapes formed to adjoin a side of the display unit, arranged along a corner of the first living hinge unit and formed to be deformed by the external force.

\* \* \* \* \*